United States Patent
Downey et al.

(10) Patent No.: US 12,529,024 B2
(45) Date of Patent: Jan. 20, 2026

(54) PROCESS AND SYSTEM FOR PRODUCING AN INOCULUM

(71) Applicant: LONZA LTD, Visp (CH)

(72) Inventors: Brandon John Downey, Visp (CH); Anthony Quach, Visp (CH)

(73) Assignee: LONZA LTD, Visp (CH)

( * ) Notice: Subject to any disclaimer, the term of this patent is extended or adjusted under 35 U.S.C. 154(b) by 881 days.

(21) Appl. No.: 17/776,414

(22) PCT Filed: Nov. 13, 2020

(86) PCT No.: PCT/US2020/060508
§ 371 (c)(1),
(2) Date: May 12, 2022

(87) PCT Pub. No.: WO2021/097281
PCT Pub. Date: May 20, 2021

(65) Prior Publication Data
US 2022/0403316 A1  Dec. 22, 2022

Related U.S. Application Data

(60) Provisional application No. 62/935,701, filed on Nov. 15, 2019.

(51) Int. Cl.
*C12M 1/00* (2006.01)
*C12M 1/34* (2006.01)
(Continued)

(52) U.S. Cl.
CPC ............ *C12M 29/10* (2013.01); *C12M 41/36* (2013.01); *C12M 41/44* (2013.01); *C12M 41/48* (2013.01)

(58) Field of Classification Search
None
See application file for complete search history.

(56) References Cited

U.S. PATENT DOCUMENTS 5,182,193 A   1/1993  Mishima et al.
5,906,940 A   5/1999  Wandrey et al.
(Continued)

FOREIGN PATENT DOCUMENTS

CA   2899308 C   4/2017
CN   103952432 B   8/2016
(Continued)

OTHER PUBLICATIONS

Wright, Benjamin et al., A novel seed-train process using high-density cell banking, a disposable bioreactor, and perfusion technologies, BioProcess International, 2015, 13(3):16-25.
(Continued)

*Primary Examiner* — Holly Kipouros
(74) *Attorney, Agent, or Firm* — MEDLER FERRO WOODHOUSE & MILLS PLLC

(57) ABSTRACT

A process and system for producing an inoculum for downstream cell production is disclosed. The inoculum is produced in a perfusion bioreactor in which the nutrient media feed is increased as the biomass concentration increases within the bioreactor. A biomass sensor can be used to periodically or continuously monitor biomass concentration. This information can be fed to a controller for automatically increasing nutrient media feed rates in a manner that is directly proportional to producing an inoculum with an increase cell density. The process and system can also include an automated subsystem for maintaining constant volume levels within the perfusion bioreactor during the process.

19 Claims, 13 Drawing Sheets

(51) Int. Cl.
  *C12M 1/36* (2006.01)
  *C12N 1/04* (2006.01)

(56) References Cited

U.S. PATENT DOCUMENTS

| | | | |
|---|---|---|---|
| 7,270,996 | B2 | 9/2007 | Cannon et al. |
| 7,732,129 | B1 | 6/2010 | Zhang et al. |
| 8,772,033 | B2 | 7/2014 | Swanda |
| 9,200,069 | B2 | 12/2015 | Ramasubramanyan et al. |
| 9,322,749 | B2 | 4/2016 | Newbold et al. |
| 9,389,151 | B2 | 7/2016 | Newbold et al. |
| 9,568,449 | B2 | 2/2017 | Downey et al. |
| 9,683,207 | B2 | 6/2017 | Cadwell et al. |
| 9,803,166 | B2 | 10/2017 | Lin et al. |
| 10,197,500 | B2 | 2/2019 | Reed et al. |
| 10,214,718 | B2 | 2/2019 | Berteau et al. |
| 10,435,670 | B2 | 10/2019 | Coffman et al. |
| 10,632,072 | B2 | 4/2020 | Costa et al. |
| 10,704,021 | B2 | 7/2020 | Lipkens et al. |
| 10,711,034 | B2 | 7/2020 | Konstantinov et al. |
| 10,822,630 | B2 | 11/2020 | Leiske et al. |
| 11,249,026 | B2 | 2/2022 | Moretto et al. |
| 11,274,121 | B2 | 3/2022 | Milano et al. |
| 11,358,984 | B2 | 6/2022 | Passno et al. |
| 11,427,848 | B2 | 8/2022 | Goudar et al. |
| 11,447,734 | B2 | 9/2022 | Reiserer et al. |
| 11,702,628 | B2 | 7/2023 | Wang et al. |
| 11,774,287 | B2 | 10/2023 | Hu et al. |
| 11,965,153 | B2 | 4/2024 | Angelini et al. |
| 12,110,330 | B2 | 10/2024 | Brower et al. |
| 12,163,122 | B2 | 12/2024 | Bennun-Serrano et al. |
| 12,221,602 | B2 | 2/2025 | Huang et al. |
| 12,227,571 | B2 | 2/2025 | Goudar et al. |
| 2006/0199260 | A1 | 9/2006 | Zhang et al. |
| 2010/0167396 | A1* | 7/2010 | Murphy ............ A61K 38/17 435/375 |
| 2014/0087413 | A1 | 3/2014 | Newbold et al. |
| 2014/0356862 | A1 | 12/2014 | Rapoport |
| 2015/0019140 | A1 | 1/2015 | Downey et al. |
| 2016/0025601 | A1 | 1/2016 | Newbold |
| 2016/0289633 | A1 | 10/2016 | Yang et al. |
| 2017/0058308 | A1 | 3/2017 | Aakesson et al. |
| 2017/0349874 | A1* | 12/2017 | Jaques ............ B01F 27/191 |
| 2018/0291329 | A1 | 10/2018 | Moretto et al. |
| 2019/0112569 | A1 | 4/2019 | Czeterko et al. |
| 2020/0255785 | A1 | 8/2020 | Erlandson et al. |
| 2021/0062157 | A1 | 3/2021 | Roudsari et al. |
| 2021/0214702 | A1 | 7/2021 | Singh et al. |
| 2022/0002652 | A1 | 1/2022 | Patrick et al. |
| 2022/0049206 | A1 | 2/2022 | Rathore et al. |
| 2022/0098556 | A1 | 3/2022 | Dobrowsky et al. |
| 2022/0135926 | A1 | 5/2022 | Matuszczyk et al. |
| 2022/0235312 | A1 | 7/2022 | Vandiver et al. |
| 2022/0259547 | A1 | 8/2022 | Khurshid |
| 2022/0325235 | A1 | 10/2022 | Yoon et al. |
| 2022/0333054 | A1 | 10/2022 | Barrett et al. |
| 2023/0053902 | A1 | 2/2023 | Love et al. |
| 2023/0090163 | A1 | 3/2023 | Aron et al. |
| 2023/0332201 | A1 | 10/2023 | Mattila et al. |
| 2024/0060031 | A1 | 2/2024 | Wagner |
| 2024/0067915 | A1 | 2/2024 | Namatame et al. |
| 2024/0069499 | A1 | 2/2024 | Lemke et al. |
| 2024/0132835 | A1 | 4/2024 | Price et al. |
| 2024/0166984 | A1 | 5/2024 | O'Mahony-Bartnett et al. |
| 2024/0168033 | A1 | 5/2024 | O'Mahony-Bartnett et al. |
| 2024/0318114 | A1 | 9/2024 | Nicolov et al. |

FOREIGN PATENT DOCUMENTS

| | | |
|---|---|---|
| CN | 111065726 A | 4/2020 |
| CN | 111372571 B | 11/2022 |
| CN | 118974267 A | 11/2024 |
| CN | 119400246 A | 2/2025 |
| EP | 2626410 A1 | 8/2013 |
| EP | 2906677 A1 | 8/2015 |
| EP | 4289927 A1 | 12/2023 |
| EP | 4347778 A1 | 4/2024 |
| EP | 4490278 A1 | 1/2025 |
| IN | 511455 B | 5/2021 |
| IN | 202417000813 A | 10/2024 |
| JP | 6199360 B2 | 9/2017 |
| JP | 2018516079 A | 6/2018 |
| JP | 6653683 B2 | 2/2020 |
| KR | 2763717 B1 | 2/2025 |
| WO | 2015/003012 A2 | 1/2015 |
| WO | 2017/072201 A2 | 5/2017 |
| WO | 2018178069 A1 | 10/2018 |
| WO | 2019/055796 A1 | 3/2019 |
| WO | 2024006397 A2 | 1/2024 |

OTHER PUBLICATIONS

Dowd et al., Optimization and control of perfusion cultures using a viable cell probe and cell specific perfusion rates, Cytotechnology, 2003, 42: 35-45.

Padawer et al., Case Study: An accelerated 8-day monoclonal antibody production process based on high seeding densities, Biotechnol Progress, 2013, 29: 829-832.

Yang et al., Perfusion seed cultures improve biopharmaceutical fed-batch production capacity and product quality, Biotechnol Progress, 2014, 30: 616-625.

Bonham-Carter, Continuous bioprocessing: industry best practices, Repligen, 2018, E-book vol. 2.

Yongky et al., Process intensification in fed-batch production bioreactors using non-perfusion seed cultures, MABS, 2019, 11(8): 1502-1514.

* cited by examiner

PROCESS AND SYSTEM FOR PRODUCING AN INOCULUM

BACKGROUND

Bioreactors, which are apparatuses in which biological reactions or processes can be carried out on a laboratory or industrial scale, are used widely within the biopharmaceutical industry. Bioreactors can be used to produce all different types of bioproducts. Bioproducts can include, for instance, cell cultures and materials derived from cell cultures including beverages, biofuels, bioenergy, biochemicals, antibiotics, amino acids, enzymes, monoclonal antibodies, monomers, proteins, food cultures, biopolymers, alcohols, flavorings, fragrances, and the like. In some embodiments, cell cultures can be grown for cell therapy. Cell therapy is the prevention, treatment, cure or mitigation of disease or injuries in humans by the administration of autologous, allogeneic or xenogeneic cells that have been manipulated or altered ex vivo. One goal of cell therapy is to repair, replace or restore damaged tissues or organs Cell cultures are typically grown in batch processes where the biological material remains in the bioreactor until the end of the reaction time. In certain of these processes, fluid medium contained within the bioreactor can be periodically or continuously removed and resupplied in order to replenish nutrients contained within the fluid medium and for possibly removing damaging by-products that are produced during the process Prior to growing cell cultures in batch reactors as described above, an inoculum process is first carried out. For example, an inoculum of the microorganism is needed so as to provide a population with a desirable viable cell count of the microorganism, suitable for scaling up to levels amenable to commercial scale production. Currently, inoculum processes are conducted in batch mode. Due to nutrient limitations and the build-up of inhibitory metabolites, there are limits on the maximum cell density than can be achieved in these conventional processes. Lower cell densities during the inoculum process can lead to extended periods of time needed in the commercial batch reactors. For example, inoculums fed to a batch reactor having a lower cell density require the downstream production bioreactor to first spend substantial amounts of time creating cell mass instead of producing the desired bioproduct, such as a protein. Ultimately, longer incubation times are needed within the larger, commercial batch reactors, which directly impacts the efficiency of the overall process.

In view of the above, a need exists for an improved method and system for producing an inoculum of a microorganism for later transfer to a larger production bioreactor. A need also exists for a method and system of procuring an inoculum that can reach higher viable cell counts and produce higher cell densities during the inoculum process. A need also exists for an inoculum process that produces an inoculum that can be fed to a production bioreactor and lower the amount of time needed in the production bioreactor for producing a bioproduct.

SUMMARY

In general, the present disclosure is directed to an inoculum process that produces rapidly increasing cell density and viable cell count over the course of the culture. The inoculum process and system of the present disclosure generally includes a perfusion bioreactor in which the perfusion rate, instead of staying constant, is evolving and increasing as the cell culture increases in biomass. In fact, an automated method can be used to adjust the nutrient fed rate to the perfusion bioreactor based upon real time biomass measurements. Through this process, an inoculum can be produced with dramatically increased cell density and/or viable cell count. The inoculum can then be fed to a larger production bioreactor for producing a bioproduct, such as a protein. Through the inoculum process and system of the present disclosure, the amount of time needed in the production bioreactor can be significantly reduced, which can dramatically increase throughput of the process. We have found that the control of the perfusion rate is improved when based on measurement of the viable cell volume/biovolume which contrasts with previous methods based on viable cell density.

Accordingly, in a first aspect, the present disclosure is directed to a process for producing an inoculum for a subsequent cell culture production process comprising:

introducing a cell culture into a perfusion bioreactor;

feeding a nutrient media at a flow rate to the perfusion bioreactor and withdrawing fluid media from the perfusion bioreactor;

determining biomass concentrations over time within the perfusion bioreactor using a biomass sensor, the biomass sensor being in communication with a controller; and adjusting the nutrient media flow rate into the perfusion bioreactor based on biomass concentrations sensed by the biomass sensor, the controller being configured to adjust the media flow rate based on information received from the biomass sensor, wherein the nutrient media flow rate is adjusted based on the following relationship:

$$P = K * \varphi$$

wherein K is the biovolume specific perfusion rate (ml feed/ml biovolume/day);

$\varphi$ is the biovolume fraction and is the volume of the perfusion bioreactor that is inside the cell membranes of the cells, expressed as a percentage or fraction (ml biovolume/ml bioreactor); and P is the perfusion rate expressed in m feed/m bioreactor/day.

In a related embodiment, the present invention also relates to a process for producing an inoculum for a subsequent cell culture production process comprising:

introducing a cell culture into a perfusion bioreactor;

feeding a nutrient media at a flow rate to the perfusion bioreactor and withdrawing fluid media from the perfusion bioreactor;

determining the biovolume fraction over time within the perfusion bioreactor using a biomass sensor, the biomass sensor being in communication with a controller; and adjusting the nutrient media flow rate into the perfusion bioreactor based on the biovolume fraction, the controller being configured to adjust the media flow rate based on information received from the biomass sensor, wherein the nutrient media flow rate is adjusted based on the following relationship: $P = K * \varphi$, as described above.

This process can be used to produce an inoculum for subsequent cell culture production processes, such as the production of a bioproduct of interest. The process can include introducing a cell culture into a perfusion bioreactor. A nutrient media can be fed at a flow rate to the perfusion bioreactor. Simultaneously, a fluid media can be withdrawn from the perfusion bioreactor. The fluid media being withdrawn from the perfusion bioreactor can also be filtered to prevent loss of cells. During growth of the cell culture in the perfusion bioreactor, a biomass concentration is determined over time using a biomass sensor that is in fluid communication with the cell culture in the perfusion bioreactor. The biomass sensor can also be in communication with a controller. The nutrient media flow rate can then be adjusted based on biomass concentration sent by the biomass sensor. The controller can be configured to adjust the media flow rate based on information received from the biomass sensor.

The biomass sensor, for instance, can comprise a capacitance sensor that is adapted to be placed within the perfusion bioreactor. Alternatively, the biomass sensor may comprise an optical cell counter. In one embodiment, for instance, the perfusion bioreactor can be in fluid communication with an automated sampling system. The automated sampling system can continuously or periodically remove sample from the perfusion bioreactor for testing using the biomass sensor. The biomass sensor can take biomass concentration readings, in one embodiment, at least every 6 hours, such as at least every 4 hours, such as at least every 30 minutes, such as at least every 10 minutes. The biomass concentration measurements can be fed to the controller which may include an algorithm for determining nutrient media flow rate. For instance, the nutrient media flow rate can be adjusted based upon the following relationship:

$$P = K * \varphi$$

wherein K is the biovolume specific perfusion rate (mL feed/mL biovolume/day);

$\varphi$ is the biovolume fraction and is the volume of the perfusion bioreactor that is inside the cell membranes of the cells, expressed as a percentage or fraction (mL biovolume/mL bioreactor); and P is the perfusion rate expressed in mL feed/mL bioreactor/day.

In general, the controller can be configured to increase the nutrient media flow rate into the perfusion bioreactor as the cell density within the bioreactor increases.

In addition to controlling the nutrient media flow rate being fed into the perfusion bioreactor, the fluid media flow rate being withdrawn from the perfusion bioreactor can also be controlled. For instance, in one embodiment, the amount of biomass and fluid media within the perfusion bioreactor can be determined. Based on this amount, the rate at which fluid media is withdrawn from the perfusion bioreactor can be selectively increased or decreased. In one embodiment, for instance, the amount of biomass and fluid media within the perfusion bioreactor can be determined using a weighing device. The weighing device can be in communication with the controller. Based on the weight information from the weighing device, the controller can be configured to control a pumping device in fluid communication with the perfusion bioreactor for selectively increasing or decreasing the rate of which fluid media is withdrawn. For example, the rate at which the fluid media is withdrawn can be done in a manner such that the volume in the perfusion bioreactor containing the fluid media and the cell culture remains constant during the process.

Instead of a weighing device, the process and system may also use a volume level indicator for determining the amount of fluid media within the perfusion bioreactor. The volume indicator can also be placed in communication with the controller for automatically controlling the withdrawal rate of fluid media from the perfusion bioreactor.

The perfusion bioreactor can generally have a volume of from about 10 liters to about 4000 liters, or about 1000 liters to about 4000 liters. During the inoculum process, the cell culture can reach a cell density within the perfusion bioreactor of greater than about $10 \times 10^6$ cell/mL, such as greater than about $30 \times 10^6$ cell/mL, such as greater than about $50 \times 10^6$ cell/mL, such as greater than about $70 \times 10^6$ cell/mL. In one embodiment, the cell culture can reach a cell density of $100 \times 10^6$ cell/mL or greater. The cell density is generally less than about $1000 \times 10^6$ cell/mL. The cell culture can remain in the perfusion bioreactor for from about 3 days to about 12 days.

The process of the present disclosure can further include the step of transferring the cell culture after a desired cell density has been reached from the perfusion bioreactor to a second bioreactor. The second bioreactor for instance, may be a batch fed reactor and can have a volume of from about 10 L to about 30,000 L. The second bioreactor, for instance, can have a volume greater than the volume of the perfusion bioreactor. For example, the ratio between the volume of the perfusion bioreactor and the volume of the second bioreactor can be from about 1:3 to about 1:40, such as from about 1:4 to about 1:10. The cell culture can remain in the second bioreactor for a period of time of less than about 12 days, such as less than about 11 days, such as less than about 10 days and still be capable of producing a desired amount of a bioproduct.

The present disclosure is also directed to a system for producing an inoculum for subsequent cell culture production processes. Accordingly in a second aspect, the present invention also relates to a system for producing an inoculum for a subsequent cell culture production process comprising;

a perfusion bioreactor;

a nutrient media feed in fluid communication with the perfusion bioreactor, the nutrient media feed for feeding a nutrient media to the perfusion bioreactor for growing a cell culture;

an effluent for withdrawing fluid media from the perfusion bioreactor;

a pumping device in fluid communication with the effluent of the perfusion bioreactor for withdrawing controlled amounts of fluid media from the perfusion bioreactor;

a weighing device for monitoring a weight of the perfusion bioreactor;

a biomass sensor, such as a capacitance sensor, in fluid communication with the perfusion bioreactor for determining biomass concentrations within the perfusion bioreactor; and a controller in communication with the biomass sensor and the weighing device, the controller being configured to control the nutrient media feed for increasing or decreasing a flow rate of nutrient media being fed to the perfusion bioreactor based on information received from the biomass sensor, the controller also being configured to control the pumping device for increasing or decreasing a flow rate of fluid media being withdrawn from the perfusion bioreactor based on information received from the weighing device, wherein the controller controls the flow weight of the nutrient media in to the perfusion bioreactor based upon the following relationship: $P = K * \varphi$, as described above.

The system includes a nutrient media feed in fluid communication with a perfusion bioreactor. The nutrient media feed is for feeding a nutrient media to the perfusion bioreactor for growing a cell culture. The perfusion bioreactor can also include an effluent for withdrawing fluid media from the perfusion bioreactor. A pumping device can be in fluid communication with the effluent for controlling flow of the fluid media out of the perfusion bioreactor. The system can further include a weighing device for monitoring the weight of the perfusion bioreactor and a biomass sensor in communication with the perfusion bioreactor for determining a biomass concentration within the perfusion bioreactor. A controller can be in communication with the biomass sensor and the weighing device. The controller can be configured to control the nutrient media feed for increasing or decreasing a flow rate of the nutrient media being fed to the perfusion bioreactor based on information received from the biomass sensor. The controller can also be configured to control the pumping device for increasing or decreasing the flow rate of fluid media from the perfusion bioreactor based on information received from the weighing device. The controller, for instance, may comprise one or more microprocessors.

As described above, the process and system of the present disclosure are particularly well suited for producing an inoculum for subsequent cell culture production processes.

Accordingly in a third aspect, the present invention relates to a cell culture production process comprising:

producing an inoculum by the method of the first aspect of the invention comprising host cells that express a bioproduct;

introducing the inoculum into a production bioreactor a cell culture into a perfusion bioreactor;

culturing the host cells to produce the bioproduct;

harvesting the bioproduct from the cell culture; and optionally subjecting the bioproduct to one or more purification steps.

Alternatively, however, the process and system of the present disclosure can be used to produce a bioproduct without transfer to subsequent batch bioreactors. For instance, in one embodiment, a cell culture can be incubated in the perfusion bioreactor to reach a desired cell density. The cell culture can then be fed to a purification process and/or fed to a process for harvesting a bioproduct from the cell culture.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

DETAILED DESCRIPTION

Figure 1:
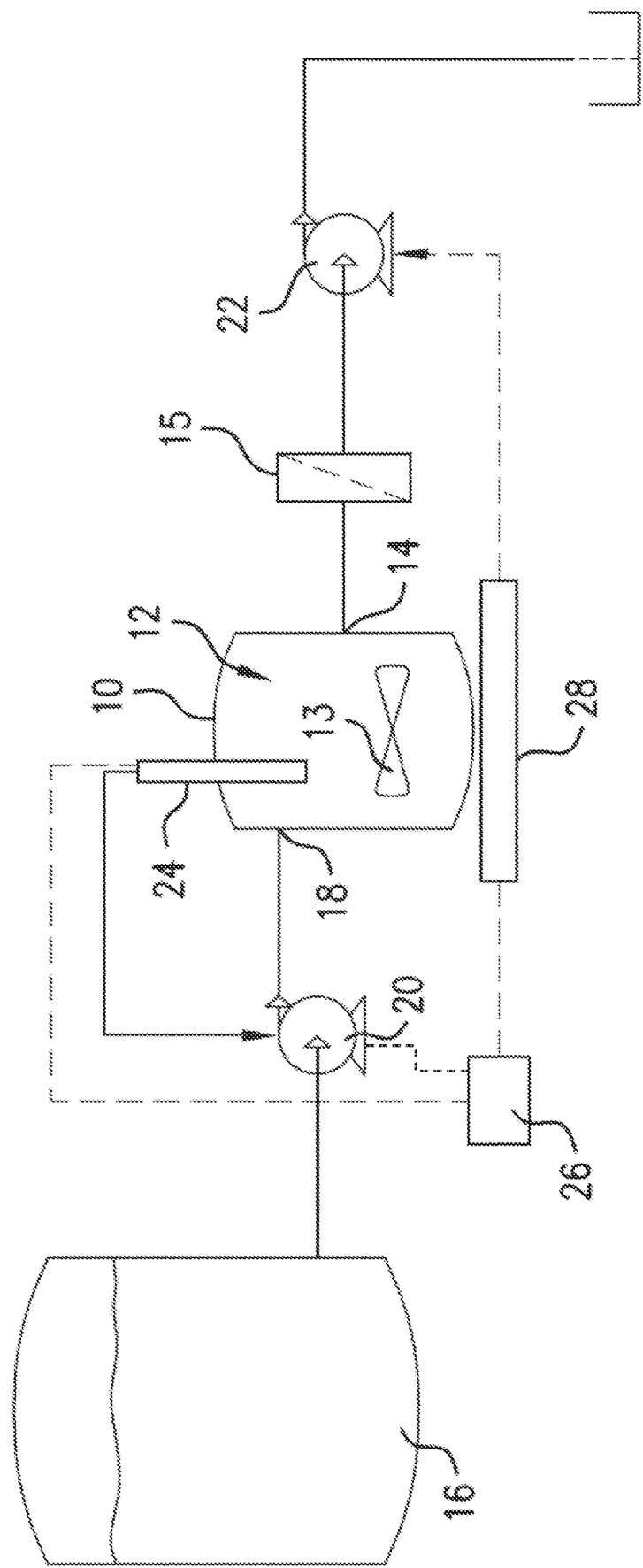
FIG. 1 is one embodiment of a perfusion bioreactor system in accordance with the present disclosure for producing an inoculum for downstream cell production.

It is to be understood by one of ordinary skill in the art that the present discussion is a description of exemplary embodiments only, and is not intended as limiting the broader aspects of the present disclosure.

In general, the present disclosure is directed to processes and systems for producing a bioproduct. More particularly, the present disclosure is directed to processes and systems for producing an inoculum that is to be transferred to a large scale bioreactor for production of a bioproduct. The inoculum is grown in a perfusion bioreactor in which the goal of the process is to produce rapidly increasing biomass over the course of the culture. Process controls are used in order to carefully control the nutrient media rate being fed to the perfusion bioreactor and the fluid media withdrawal rate from the perfusion bioreactor. In accordance with the present disclosure, the nutrient media flow rate and the withdrawal flow rate are periodically and/or constantly being adjusted in order to maintain an optimum feed rate per biomass within the perfusion bioreactor while maintaining constant volume or constant mass conditions. In one embodiment, the process can be totally automated to adjust the nutrient media feed rate based upon biomass concentration measurements being conducted in real time. The nutrient media feed rate, for instance, can be adjusted such that the rate is directly proportional to the current biomass in the reactor.

In addition to producing an inoculum, the processes and systems of the present disclosure can also be used to produce a cell culture where further incubation times are not needed. For instance, the perfusion bioreactor of the present disclosure can produce a cell culture having cell densities wherein a bioproduct can be harvested directly from the perfusion bioreactor. Alternatively, a cell culture incubated in the perfusion bioreactor can be fed to a purification process for later harvesting a bioproduct.

The methods and systems of the present disclosure can be applied to any suitable cell culture product. For instance, the methods of the present disclosure are particularly well suited to the production of biopharmaceuticals such as bio-therapeutic proteins. Bio-therapeutic proteins, for instance, are produced from genetically modified mammalian cells. In one embodiment, the cell cultures can be produced via recombinant gene expression in cell hosts. Such production can be from cell lines from established cultures, such as, for example, CHO, NSO, or PER.C6. These cells can express the protein of interest and subsequently secrete the protein into the media. It should be understood, however, that the processes and techniques of the present disclosure are not limited to the production of proteins and that any suitable cell culture can be subjected to the controls described herein.

As described above, in one embodiment, the present disclosure is generally directed to a system and process for producing an inoculum that can be transferred to a larger bioreactor, such as a commercial scale bioreactor. In accordance with the present disclosure, an inoculum can be prepared that contains a microorganism in a state that is compatible and well suited for further growth in a production bioreactor at a relatively high cell density and viable cell count. For instance, the processes and systems of the present disclosure can achieve a high level of viable biomass in a suitable physiological state for use as an inoculant. In addition to producing proteins, the processes and systems of the present disclosure can be used to produce antimicrobials, enzymes, beverages, drugs, toxins, vitamins, amino acids, and the like.

Referring to FIG. 1, one embodiment of a perfusion bioreactor system that may be used in accordance with the present disclosure for generating an inoculum is illustrated. The diagram illustrated in FIG. 1 is for exemplary purposes only and in no way limits the type of perfusion bioreactor system that may be used to generate quality attribute information. In general, the perfusion bioreactor system can be configured to be a highly automated process development platform. Using the perfusion bioreactor system, an inoculum can be produced having a very high cell density and/or viable cell count.

As shown in FIG. 1, the perfusion bioreactor system includes a perfusion bioreactor 10. The perfusion bioreactor 10 may comprise any suitable bioreactor depending upon the cell culture being propagated. For instance, the perfusion bioreactor 10 may comprise a fermenter, a stirred-tank reactor, a wave-type bioreactor, a rocking reactor, or the like. The perfusion bioreactor 10 in the embodiment illustrated in FIG. 1 comprises a hollow vessel or container that includes a bioreactor volume 12 for receiving a cell culture within a fluid growth medium. The perfusion bioreactor 10 can be placed in association with a rotatable shaft coupled to an agitator 13 for stirring the cell culture contained within the bioreactor volume 12.

The perfusion bioreactor 10 can be made from various materials. For instance, the bioreactor 10 can be made from a metal, such as stainless steel, and can be designed to be reused. Alternatively, the perfusion bioreactor 10 may comprise a single use bioreactor made from a rigid polymer or a flexible polymer film. When made from a rigid polymer, for instance, the bioreactor walls can be free standing. Alternatively, the bioreactor 10 can be made from a flexible polymer film or shape conforming material that can be liquid impermeable and can have an interior hydrophilic surface. In one embodiment, the perfusion bioreactor 10 can be made from a flexible polymer film that is designed to be inserted into a rigid structure, such as a metal container for assuming a desired shape.

The perfusion bioreactor 10 can have any suitable volume. For instance, the volume of the perfusion bioreactor 10 can be generally greater than about 1 L, such as greater than about 5 L, such as greater than about 10 L. In embodiments, the volume of the perfusion bioreactor 10 is generally less than about 400 L, such as less than about 250 L, such as less than about 100 L. Alternatively, the perfusion bioreactor 10 can have a relatively large volume. For instance, the perfusion bioreactor may have a volume of greater than 250 L, such as greater than 500 L, such as greater than 750 L, such as greater than 1000 L, such as greater than 1500 L, and generally less than about 4000 L, such as less than about 3000 L, and for example is about 10 L to about 4000 L.

The perfusion bioreactor 10 can also include various other components and equipment, such as baffles, spargers, gas supplies, heat exchangers, and the like which allow for the cultivation and propagation of biological cells. In addition, the perfusion bioreactor 10 can be in communication with various sensors, such as a pH sensor, a gas sensor, a temperature sensor and the like.

The perfusion bioreactor 10 is designed so as to continuously receive various inputs, such as a nutrient media, and to continuously remove spent media so as to maintain pseudo-steady-state conditions within the cell culture contained within the bioreactor 10. For example, in one embodiment, the perfusion bioreactor 10 is operated so as to maintain a relatively constant volume of cell culture and media. For example, the perfusion bioreactor 10 can be operated so that the volume within the bioreactor does not vary by more than 10%, such as by no more than about 8%, such as by no more than about 5%, such as by no more than about 3%.

There are various different ways to remove spent media from the perfusion bioreactor 10 without depleting the biological cells. For instance, in one embodiment, the perfusion bioreactor can include attachment devices, such as capillary fibers or membranes, which the cells bind to, thereby preventing their release. In other embodiments, the perfusion bioreactor 10 can include a filter device 15 that maintains a desired cell density with the bioreactor. By continuously removing spent media from the perfusion bioreactor 10 and replacing it with new media, nutrient levels can be controlled and maintained for varying the growing conditions within the bioreactor. In addition, cell waste can be removed in a controlled fashion to avoid toxicity.

The perfusion bioreactor 10 can include a plurality of ports. The ports can allow supply lines and feed lines into and out of the bioreactor 10 for adding and removing fluids and other materials. In addition, the one or more ports may be connected to one or more probes for monitoring conditions within the perfusion bioreactor 10.

In the embodiment illustrated in FIG. 1, for instance, the perfusion bioreactor 10 includes an effluent port 14 and an influent port 18. The effluent port 14 is for continuously or periodically removing liquid media from the perfusion bioreactor 10. The effluent port 14 can be in fluid communication with a pump 22 for controlling flow rates. The influent port 18, on the other hand, can be in fluid communication with a nutrient media supply 16 and a pump 20. The pump 20 can be designed to pump controlled amounts of a nutrient media feed into the perfusion bioreactor 10 through the influent port 18. In one embodiment, only a single influent port 18 is needed in order to supply a nutrient media to the perfusion bioreactor 10. In other embodiments, however, multiple ports may be used in order to feed a nutrient media, a basal media, and/or any other components, such as pH adjusters, gases such as oxygen, nitrogen, and carbon dioxide, or the like.

As used herein, a nutrient media or nutrient refers to any fluid, compound, molecule, or substance that can increase the mass of a bioproduct, such as anything that may be used by an organism to live, grow or otherwise add biomass. For example, a nutrient feed can include a gas, such as oxygen or carbon dioxide that is used for respiration or any type of metabolism. Other nutrient media can include carbohydrate sources. Carbohydrate sources include complex sugars and simple sugars, such as glucose, maltose, fructose, galactose, and mixtures thereof. A nutrient media can also include an amino acid. The amino acid may comprise, glycine, alanine, valine, leucine, isoleucine, methionine, proline, phenylalanine, tryptophan, serine, threonine, asparagine, glutamine, tyrosine, cysteine, lysine, arginine, histidine, aspartic acid and glutamic acid, single stereoisomers thereof, and racemic mixtures thereof. In some embodiments, the amino acid is glutamate, glutamine, lysine, tyrosine or valine.

The nutrient media can also contain one or more vitamins. Vitamins that may be contained in the nutrient media include group B vitamins, such as B12. Other vitamins include vitamin A, vitamin E, riboflavin, thiamine, biotin, and mixtures thereof. The nutrient media can also contain one or more fatty acids and one or more lipids. For example, a nutrient media feed may include cholesterol, steroids, and mixtures thereof. A nutrient media may also supply proteins and peptides to the bioreactor. Proteins and peptides include, for instance, albumin, transferrin, fibronectin, fetuin, and mixtures thereof. A growth medium within the present disclosure may also include growth factors and growth inhibitors, trace elements, inorganic salts, hydrolysates, and mixtures thereof. Trace elements that may be included in the growth medium include trace metals. Examples of trace metals include cobalt, nickel, and the like.

As shown in FIG. 1, the system further includes a biomass sensor 24. The biomass sensor 24 can be used to assay biomass concentrations within the perfusion bioreactor 10. As used herein "biomass concentrations" refers to the volume contained within the cells (typically the viable cells) in the bioreactor, relative to the total volume of the bioreactor 10 (mL/mL), which refers to the total filled volume (liquid volume) of the bioreactor, i.e., containing liquid medium, cells, cell debris and the like. The biomass sensor 24, for instance, can be a capacitance probe. Cells contained within the perfusion bioreactor 10 with intact plasma membranes act as capacitors under the influence of an electric field. The non-conducting nature of the plasma membrane allows a buildup of charge. The resulting capacitance can then be measured. The biomass sensor 24, for instance, can use radio frequency impedance to measure biomass within the perfusion bioreactor 10 periodically or continuously. RF impedance, for instance, allows for a measurement of the dielectric properties of the cell suspension. The resulting measurement can be used to derive the biomass content (such as the viable cell volume) present in the perfusion bioreactor 10 as well as other cell properties such as cell diameter (see for example U.S. Pat. No. 9,568,449, the disclosure of which is incorporated by reference herein in its entirety, including the disclosure of biomass content measurement). The biomass sensor 24 can be a device that is used repeatedly or can be a single use device. In one embodiment, for instance, the biosensor may be a patch sensor that can be used once and disposed.

When using a capacitance probe, the capacitance probe may operate in a frequency range of from about 500 KHz to about 20,000 KHz. The capacitance measuring range can be from about 0 to about 400 pF/cm. The conductivity can range from about 1 to about 40 mS/cm. A suitable method for measurement of biomass concentration using a capacitance probe is provided in the Examples. Suitable capacitance probes include BioPAT® ViaMass, Sartorius Stedim Biotech e.g. for single-use applications and a Futura 12 mm Probe, Aber Instruments Ltd e.g. for multi-use applications.

In addition to a capacitance probe, the biomass mass sensor 24 can be any other suitable instrument capable of monitoring or determining biomass concentration or cell count. For example, in an alternative embodiment, the biomass senor 24 can be an optical cell counter. Optical cell counters, for instance, are commercially available from ThermoFisher Scientific under tradenames COUNTESS II or COUNTESS II FL automated cell counters. Optical cell counters include autofocusing and counter algorithms that identify cells within a population for determining biomass concentrations. Methods for determining biomass concentration (biovolume) utilizing an optical cell counter are known in the art and utilize measurement of cell count in combination with cell diameter, from the optical device, to calculate biomass concentration. Additional methods for determining biomass concentration include, for example, microscopy-based methods.

As shown in FIG. 1, the biomass sensor 24 can be contained within the volume 12 of the perfusion bioreactor 10 for intimate contact with the cell culture contained within the bioreactor. In the embodiment illustrated in FIG. 1, for instance, the biomass sensor 24 may be a capacitance probe as described above.

Alternatively, the system can include at least one sample collection subsystem that obtains biomass samples from the perfusion bioreactor and analyzes the samples for biomass concentrations and/or other components. For example, in one embodiment, the perfusion bioreactor 10 can be in fluid communication with an automated sampling and testing system. A biomass sample can be fed to an aseptic autosampler to deliver samples to a liquid handling robot that automates the sample preparation if necessary. The sampling and testing system can measure and monitor any parameter within the cell culture including cell counts and biomass concentrations. One example, of a modular automated sampling system is sold under the name MAST by Lonza Ltd. Automated sampling systems are described, in U.S. Patent Publication No. 2014/0087413, U.S. Pat. Nos. 9,389,151, 9,322,749, U.S. Patent Publication No. 2015/0019140, and U.S. Patent Publication No. 2016/0025601, which are all incorporated herein by reference.

When conducting biomass concentration measurements using an automated sampling system, the biomass sensor can comprise a capacitance probe or an optical cell counter.

The biomass sensor 24 can take readings at least every 6 hours, such as at least every 4 hours, such as at least every 2 hours, such as at least every hour, such as at least every 30 minutes, such as at least every 15 minutes, such as at least every 10 minutes. In one embodiment, the biomass sensor 24 can continuously monitor biomass concentrations within the perfusion bioreactor 10.

The biomass sensor 24 can be in communication with a controller 26 and the pump 20. The controller 26, for instance, may comprise one or more programmable devices, such as one or more microprocessors. The controller 26 can be configured to receive biomass concentration measurements from the biomass sensor 24. Based upon information received from the biomass sensor 24, the controller 26 can be configured to control nutrient media flow rate into the perfusion bioreactor 10 by controlling the pump 20.

In conventional perfusion bioreactors, the perfusion rate stays generally within a relatively narrow range. In the process of the present disclosure, however, in order to produce an inoculum with dramatically improved cell densities and viable cell counts, the perfusion rate or rate at which the nutrient media is fed to the perfusion bioreactor 10 is constantly changing as the biomass or cell culture within the perfusion bioreactor 10 is rapidly increasing.

For example, in accordance with the present disclosure, the flow rate of the nutrient media from the nutrient media supply 16 changes in a manner which is directionally proportional to the current amount of biomass contained within the perfusion bioreactor 10 as is determined by the biomass sensor 24. The biomass sensor 24 can make biomass concentration measurements in real time which are fed to the controller 26 which allows for complete automation of the nutrient media flow rate through the bioreactor. During the process, for instance, the nutrient media flow rate is ramped up according to viable biomass concentrations. For example, in one embodiment, the controller 26 can be programed with an algorithm that determines nutrient flow rate based upon information received from the biomass sensor 24. In one embodiment, the algorithm can be based upon the following:

$$P = \frac{K * \varphi}{V}$$

wherein K is the biovolume specific feed rate, and has units of mL/biovolume/day, Biovolume (shown as φ) is the percentage of the reactor volume (fill volume) that is inside the cell membranes of the cells, expressed as a %;

V is the vessel volume in mL; and

P is the total bioreactor perfusion feed rate in vessel volumes/day.

This relationship can also be expressed as:

$$P = K * \varphi$$

wherein K is the biovolume specific perfusion rate (mL feed/mL biovolume/day);

φ is the biovolume fraction and is the volume of the perfusion bioreactor (fill volume) that is inside the cell membranes of the cells, expressed as a percentage or fraction (mL biovolume/mL bioreactor); and P is the perfusion rate expressed in mL feed/mL bioreactor/day. Another way to express this, especially where capacitance is used to derive biomass, is as a percentage based on the volume within the cell membranes of viable cell cells (VCV) divided by the total fill volume of the bioreactor (i.e. occupied by culture media and cells/debris etc.).

The above relationship can be determined for any particular cell culture being grown in the perfusion bioreactor 10 and based upon other various process conditions. Through experimental or theoretical calculations, K in the above equation can be determined. For example, in one embodiment, K can vary from about $1 \times 10^{-9}$ to about $250 \times 10^{-9}$, suitably about $1 \times 10^{-9}$ to about $50 \times 10^{-9}$, or about $1 \times 10^{-9}$ to about $20 \times 10^{-9}$, including about $1 \times 10^{-9}$ to about $10 \times 10^{-9}$, about $4 \times 10^{-9}$ to about $9 \times 10^{-9}$, or about $7 \times 10^{-9}$. As described herein, it has been surprisingly found that the use of biovolume (percentage of the reactor volume that is inside the cell membranes of the cells) provides a better predictor of the required nutrient media flow, as compared with measurements made using viable cell density (VCD) (i.e., cell count). VCD assumes that the nutrient consumption rate per cell is constant, and thus it is simply the number of cells that is important. However, as larger cells consume more nutrients than smaller cells, a more accurate predictor of the use of nutrients is based on biovolume, as described herein.

In addition to controlling the nutrient media feed rate into the perfusion bioreactor 10, the processes and systems of the present disclosure as shown in FIG. 1 can also be configured to control the rate at which the liquid media is withdrawn from the bioreactor 10 through the effluent 14 using the pump 22. For example, in one embodiment, the system can include a weighing device 28, such as a load cell. The weighing device 28 can monitor the weight of the liquid media and the biomass contained within the perfusion bioreactor 10. As shown in FIG. 1, the weighing device 28 can be in communication with the controller 26 and the pump 22. The controller 26, based upon information received from the weighing device 28, can be configured to control the amount of liquid media being withdrawn from the perfusion bioreactor 10 using the pump 22. In addition to relying on information received from the weighing device 28, the controller 26 can also factor in the increasing nutrient media flow rate into the bioreactor when determining the rate in which fluid media is withdrawn from the bioreactor.

In addition to a weighing device 28, the system can also include other devices for determining the amount of liquid media within the perfusion bioreactor 10. For example, in an alternative embodiment, the system can include a volume level indicator that monitors the volume of the liquid media within the bioreactor 10. The volume level indicator can also be placed in communication with the controller 26.

In one embodiment, the controller 26 can be configured to operate the perfusion bioreactor 10 so as to maintain a relatively constant volume. For instant, the volume can vary by no more than about 20%, such as by no more than about 15%, such as by no more than about 10%, such as by no more than about 5%, such as by no more than about 2% during the process.

Through the processes and systems of the present disclosure, inoculums for downstream cell production can be produced with extremely high cell densities and viable cell count. For example, the cell culture in the perfusion bioreactor can increase in cell density or biomass concentration in an amount greater than about 30% by day, such as greater than about 40% by day, such as greater than about 50% by day, such as greater than about 60% by day, such as greater than about 70% by day, such as greater than about 80% by day, such as greater than about 90% by day, such as greater than about 100% by day, such as greater than about 110% by day, such as greater than about 120% by day. The biomass concentration, for instance, can increase by over 150% by day, such as over 200% by day, such as over 250% by day.

After a desired amount of growth within the perfusion bioreactor, the inoculum or cell culture is transferred to a downstream larger bioreactor for continued growth and harvesting of a bioproduct. The cell culture can remain in the perfusion bioreactor for a time sufficient to achieve a desired cell density or biomass concentration. For instance, in accordance with the present disclosure, the cell culture or inoculum can have a cell density of greater than about $10 \times 10^6$ cell/mL, such as greater than about $30 \times 10^6$ cell/mL, such as greater than about $50 \times 10^6$ cell/mL, such as even greater than $70 \times 10^6$ cell/mL. In embodiments, cell densities achieved within the perfusion bioreactor can be at $100 \times 10^6$ cell/mL, $200 \times 10^6$ cell/mL, $220 \times 10^6$ cell/mL, $250 \times 10^6$ cell/mL, or greater. The desired cell density, however, may depend upon various process conditions and the type of cell culture being produced.

In general, any suitable inoculum can be produced using the process and system of the present disclosure. In one embodiment, for instance, the inoculum may contain mammalian cells.

Increasing the cell density and/or viable cell count of an inoculum can produce many benefits and advantages during downstream production. Inoculums with high cell densities, for instance, can shorten the amount of time the cell culture remains in a downstream larger, production bioreactor. Reducing the amount of incubation time in the production bioreactors directly impacts process efficiency. For example, large commercial-scale bioreactors take up most of the floor space in a production facility. Thus, incubation time in the production bioreactors is the limiting event in production efficiency. Through the process and system of the present disclosure, however, incubation times can be dramatically reduced in the downstream production bioreactors resulting in increased space time yield. In fact, these benefits and advantages are achieved even if inoculum incubation times are increased in the perfusion bioreactor.

Figure 2:
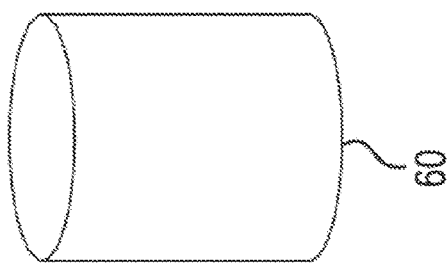
FIG. 2 is one embodiment of a system for producing an inoculum and transferring the inoculum to a large scale bioreactor for producing a bioproduct.
Figure 2:
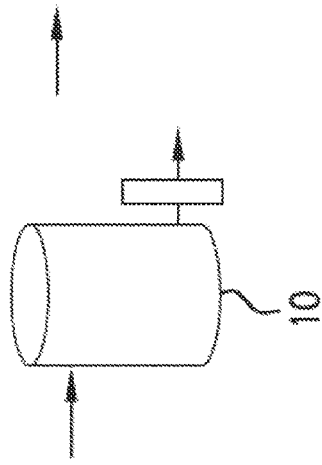
Figure 2:
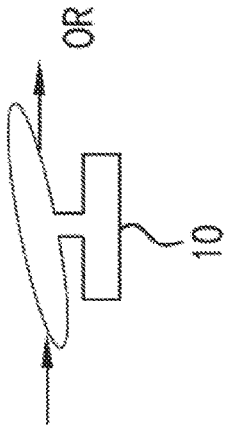
Figure 2:
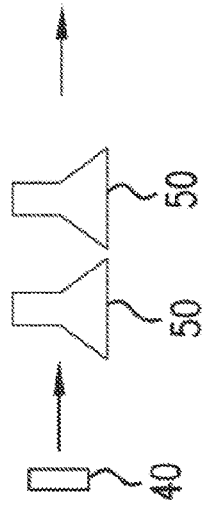

Referring to FIG. 2, one embodiment of a production process for producing a bioproduct is illustrated. As shown, in one embodiment, an inoculum 40 can first be fed to small cell culture vessels 50. The cell culture vessels 50, for instance, may be shake flask expansion devices. The inoculum can be grown to a limited extent in these dedicated incubator vessels. The cell culture vessels 50, for instance, can generally have a volume of greater than about 0.5 L, such as greater than about 1 L, such as greater than about 2 L, and generally less than about 5 L, such as less than about 4 L, such as less than about 3 L.

From the cell culture vessels 50, the inoculum is then fed to the perfusion bioreactor 10 of the present disclosure. As shown in FIG. 2, the perfusion bioreactor 10 can be a rocking-bioreactor or wave-bioreactor or a stirred-tank bioreactor. In one embodiment, the perfusion bioreactor 10 can have a volume of from about 5 L to about 4000 L, such as from about 10 L to about 3000 L, such as from about 50 L to about 2000 L. The perfusion bioreactor 10 can be a stainless steel vessel or can be a disposable bag-type bioreactor that is used as a lining in a holding vessel.

Incubation times within the perfusion bioreactor 10 can vary depending upon the inoculum being produced and the desired final cell density. For example, the incubation time of the inoculum with the perfusion bioreactor 10 can generally be greater than about 3 days, such as greater than about 5 days, such as greater than about 7 days, such as greater than about 9 days, and generally less than about 15 days, such as less than about 12 days, such as less than about 11 days. As described above, the perfusion bioreactor 10 is particularly well adapted for producing an inoculum having dramatically improved cell densities and viable cell counts.

From the perfusion bioreactor 10, the inoculum is then fed to a production bioreactor 60 for producing a bioproduct. In one embodiment, the production bioreactor 60, for instance, can have a volume of greater than about 500 L, such as greater than about 600 L, such as greater than about 700 L, and generally less than about 30,000 L, such as less than about 20,000 L, such as less than about 10,000 L. In general, the production bioreactor 60 has a larger volume than the perfusion bioreactor 10. For example, the volume ratio between the perfusion bioreactor and the production bioreactor can be from about 1:3 to 1:40, such as from about 1:4 to about 1:10 (e.g., a 4,000 L perfusion bioreactor and a 20,000 L production (e.g., batch fed) bioreactor.

Due to the increased cell density of the inoculum fed to the production bioreactor 60, incubation times within the bioreactor 60 can be greatly reduced. For example, conventional systems typically require incubation times of 15 days or longer. Incubation times within the production bioreactor 60 in accordance with the present disclosure, however, can be less than about 13 days, such as less than about 12 days, such as less than about 11 days, such as less than about 10 days, such as less than about 9 days, such as even less than about 8 days. Incubation time is generally greater than about 3 days, such as greater than about 5 days. Any reduction in the incubation time within the production bioreactor 60 has significant effects on increased efficiency in the overall process.

Figure 3:
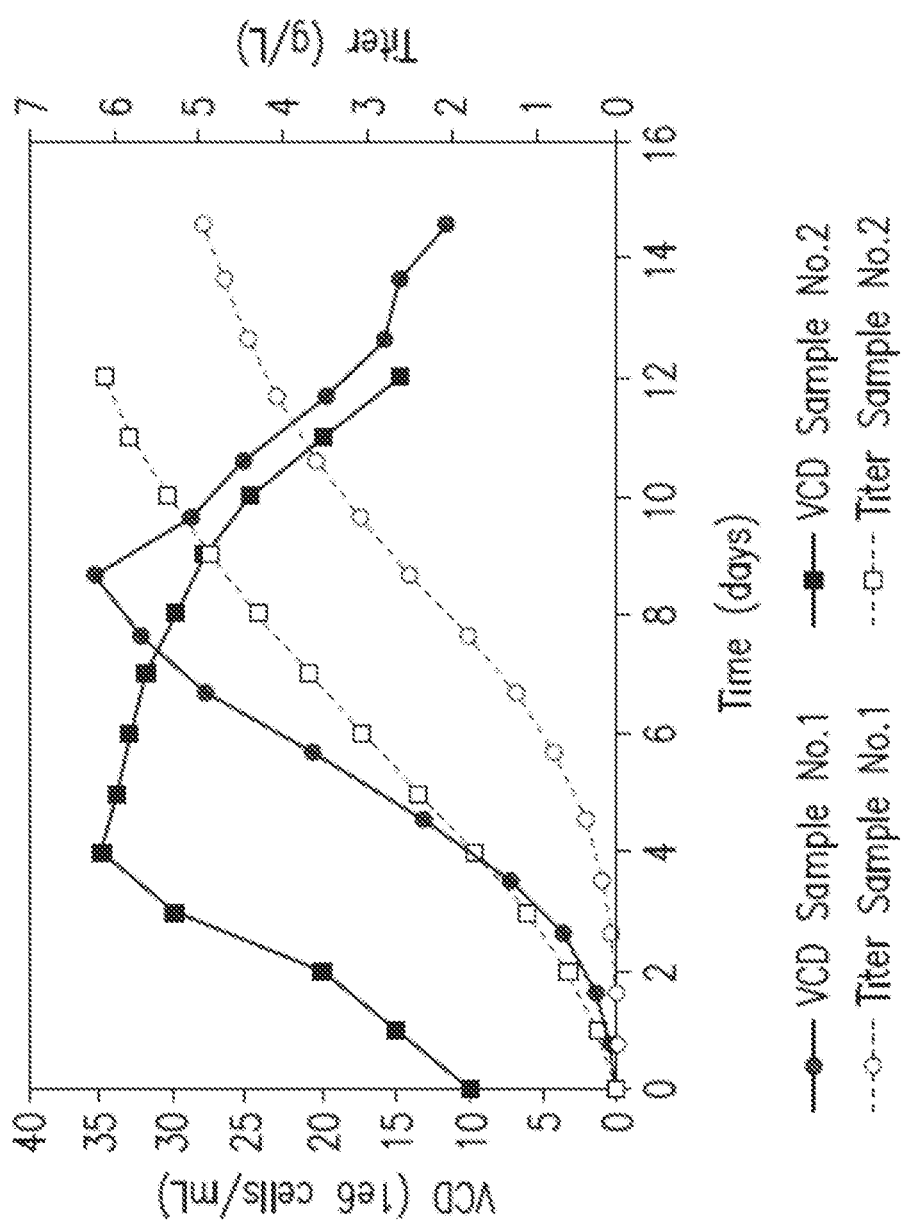
FIG. 3 is a graphical representation illustrating various benefits and advantages of the present disclosure.

By producing an inoculum with greater cell densities, higher titers can be produced in the production bioreactor in a shorter period of time by eliminating unproductive start up days within the production bioreactor. In order to illustrate this effect, FIG. 3 is a graphical representation of some of the benefits of the process of the present disclosure. The graph in FIG. 3 illustrates viable cell density and titer over time in a production bioreactor. Sample No. 1 represents a conventional process in which the inoculum fed to the production bioreactor had a cell density of $5 \times 10^5$ cell/mL. Sample No. 2 made in accordance with the present disclosure, however, represents feeding an inoculum to a production bioreactor at a cell density of $10 \times 10^6$ cell/mL. As shown, Sample No. 2 produces a dramatically better growth rate and overall higher titer. For example, after 15 days Sample No. 1 reached a titer of 4.95 g/L, while Sample No. 2 reached a titer of 6.13 g/L only over 12 days. Dividing titer by incubation time results in a space-time yield. Sample No. 1 produced a space-time yield of 0.3 g/L/day while Sample No. 2 produced a space-time yield of 0.51 g/L/day. Thus, the process in accordance with the present disclosure produced a 50% increase in space-time yield.

As described above, the perfusion bioreactor of the present disclosure can produce significant and dramatic increases in cell densities in comparison to many conventional processes. In fact through experimental procedures, the perfusion bioreactor of the present disclosure can produce a cell culture having cell densities of $80 \times 10^6$ cell/mL, such as $90 \times 10^6$ cell/mL. In fact, the perfusion bioreactor of the present disclosure has demonstrated the ability to produce cell densities of $100 \times 10^6$ cell/mL or greater.

Due to the increased cell densities, in addition to producing inoculums, the perfusion bioreactor of the present disclosure can also be used to produce a final product. For example, in one embodiment, the perfusion bioreactor of the present disclosure can be used to incubate a cell culture and a bioproduct can be harvested directly from the cell culture. In one embodiment, the cell culture produced in the perfusion bioreactor can be fed to a downstream purification process for then harvesting a bioproduct. Accordingly, the present invention also relates to a cell culture production process comprising:

producing an inoculum by the method of the first aspect of the invention comprising host cells that express a bioproduct;
introducing the inoculum into a production bioreactor a cell culture into a perfusion bioreactor;
culturing the host cells to produce the bioproduct;
harvesting the bioproduct from the cell culture; and
optionally subjecting the bioproduct to one or more purification steps.

In one embodiment, the inoculum is introduced into the production bioreactor to a final density of at least $5 \times 10^6$ cells/ml, such as at least 8 or $10 \times 10^6$ cells/ml. This, for example, can represent a 4 to 10-fold dilution of the inoculum from the N−1 process of the invention.

In embodiments, the cells express or produce a product, such as a recombinant therapeutic or diagnostic product. Examples of products produced by cells include, but are not limited to, antibody molecules (e.g., monoclonal antibodies, bispecific antibodies), antibody mimetics (polypeptide molecules that bind specifically to antigens but that are not structurally related to antibodies such as e.g. DARPins, affibodies, adnectins, or IgNARs), fusion proteins (e.g., Fc fusion proteins, chimeric cytokines), other recombinant proteins (e.g., glycosylated proteins, enzymes, hormones), viral therapeutics (e.g., anti-cancer oncolytic viruses, viral vectors for gene therapy and viral immunotherapy), cell therapeutics (e.g., pluripotent stem cells, mesenchymal stem cells and adult stem cells), vaccines or lipid-encapsulated particles (e.g., exosomes, virus-like particles), RNA (such as e.g. siRNA) or DNA (such as e.g. plasmid DNA), antibiotics or amino acids. In embodiments, the devices, facilities and methods can be used for producing biosimilars.

As mentioned, in embodiments, devices, facilities and methods allow for the production of eukaryotic cells, e.g., mammalian cells or lower eukaryotic cells such as for example yeast cells or filamentous fungi cells, or prokaryotic cells such as Gram-positive or Gram-negative cells and/or products of the eukaryotic or prokaryotic cells, e.g., proteins, peptides, antibiotics, amino acids, nucleic acids (such as DNA or RNA), synthesized by the eukaryotic cells in a large-scale manner. Unless stated otherwise herein, the devices, facilities, and methods can include any desired volume or production capacity including but not limited to bench-scale, pilot-scale, and full production scale capacities.

Moreover and unless stated otherwise herein, the devices, facilities, and methods can include any suitable reactor(s) including but not limited to stirred tank, airlift, fiber, microfiber, hollow fiber, ceramic matrix, fluidized bed, fixed bed, and/or spouted bed bioreactors. As used herein, "reactor" can include a fermenter or fermentation unit, or any other reaction vessel and the term "reactor" is used interchangeably with "fermenter." For example, in some aspects, an example bioreactor unit can perform one or more, or all, of the following: feeding of nutrients and/or carbon sources, injection of suitable gas (e.g., oxygen), inlet and outlet flow of fermentation or cell culture medium, separation of gas and liquid phases, maintenance of temperature, maintenance of oxygen and $CO_2$ levels, maintenance of pH level, agitation (e.g., stirring), and/or cleaning/sterilizing. Example reactor units, such as a fermentation unit, may contain multiple reactors within the unit, for example the unit can have 1, 2, 3, 4, 5, 10, 15, 20, 25, 30, 35, 40, 45, 50, 60, 70, 80, 90, or 100, or more bioreactors in each unit and/or a facility may contain multiple units having a single or multiple reactors within the facility. In various embodiments, the bioreactor can be suitable for batch, semi fed-batch, fed-batch, perfusion, and/or a continuous fermentation processes. Any suitable reactor diameter can be used. In embodiments, the bioreactor can have a volume between about 100 mL and about 50,000 L. Non-limiting examples include a volume of 100 mL, 250 mL, 500 mL, 750 mL, 1 liter, 2 liters, 3 liters, 4 liters, 5 liters, 6 liters, 7 liters, 8 liters, 9 liters, 10 liters, 15 liters, 20 liters, 25 liters, 30 liters, 40 liters, 50 liters, 60 liters, 70 liters, 80 liters, 90 liters, 100 liters, 150 liters, 200 liters, 250 liters, 300 liters, 350 liters, 400 liters, 450 liters, 500 liters, 550 liters, 600 liters, 650 liters, 700 liters, 750 liters, 800 liters, 850 liters, 900 liters, 950 liters, 1000 liters, 1500 liters, 2000 liters, 2500 liters, 3000 liters, 3500 liters, 4000 liters, 4500 liters, 5000 liters, 6000 liters, 7000 liters, 8000 liters, 9000 liters, 10,000 liters, 15,000 liters, 20,000 liters, 30,000 liters, 40,000 liters, and/or 50,000 liters. Additionally, suitable reactors can be multi-use, single-use, disposable, or non-disposable and can be formed of any suitable material including metal alloys such as stainless steel (e.g., 316 L or any other suitable stainless steel) and Inconel, plastics, and/or glass.

Once biosynthesis of the product by the production cells has progressed to a satisfactory point, the product can be harvested e.g. withdrawing culture medium and separating the supernatant from cells and cell debris. The product can be subject to one or more purification/treatment steps to obtain purified product, such as affinity chromatography, ion exchange chromatography, filtration and/or viral inactivation. The product may also be combined with one or more pharmaceutically acceptable carriers, excipients or diluents to produce a composition such as a formulated pharmaceutical composition e.g. with one or more of a buffer, a surfactant, a stabilizer (such as trehalose, sucrose, glycerol), an amino acid (such as glycine, histidine, arginine), metal ions/chelators, salts and/or a preservative.

The devices, facilities and methods described herein are suitable for culturing any desired cell line including prokaryotic and/or eukaryotic cell lines. Further, in embodiments, the devices, facilities and methods are suitable for culturing suspension cells or anchorage-dependent (adherent) cells and are suitable for production operations configured for production of pharmaceutical and biopharmaceutical products—such as polypeptide products, nucleic acid products (for example DNA or RNA), or cells and/or viruses such as those used in cellular and/or viral therapies. In one embodiment, the host cell is a mammalian cell. Example species from which host cell can be derived include human, mouse, rat, Chinese hamster, Syrian hamster, monkey, ape, dog, horse, ferret, and cat. In embodiments, the host cell is a Chinese hamster ovary (CHO) cell. In one embodiment, the host cell is a CHO-K1 cell, a CHOK1SV® cell, a DG44 CHO cell, a DUXB11 CHO cell, a CHO-S, a CHO GS knock-out cell (a CHO cell where all endogenous copies of the glutathione synthetase (GS) gene have been inactivated), a CHOK1SV® FUT8 knock-out cell, a CHOZN, or a CHO-derived cell. The CHO GS knock-out cell (e.g., GS-KO cell) is, for example, a CHOK1SV® GS knockout cell (such as a GS Xceed® cell—CHOK1SV GS-KO®, Lonza Biologics, Inc.). The CHO FUT8 knockout cell is, for example, the Potelligent® CHOK1SV® FUT8 knock-out (Lonza Biologics, Inc.).

In embodiments and unless stated otherwise herein, the devices, facilities, and methods described herein can also include any suitable unit operation and/or equipment not otherwise mentioned, such as operations and/or equipment for separation, purification, and isolation of such products. Any suitable facility and environment can be used, such as traditional stick-built facilities, modular, mobile and temporary facilities, or any other suitable construction, facility, and/or layout. For example, in some embodiments modular clean-rooms can be used. Additionally and unless otherwise stated, the devices, systems, and methods described herein can be housed and/or performed in a single location or facility or alternatively be housed and/or performed at separate or multiple locations and/or facilities.

EXAMPLES

Example 1: Perfusion Reactor Feeding Based on Biovolume Predicts Positive Culture Performance and is Superior to Feeding Based on Cell Count Capacitance Measurement of Biomass Concentration (Biovolume)

Culture biomass concentration (biovolume) were carried out using a Aber Futura capacitance probe (Aber Instruments Ltd, Aberystwyth, UK). The capacitance was measured every 30 seconds at 1000 kHz. The capacitance signal was filtered using a 30 sample moving average filter, and no electrode polarization was applied to signal. The capacitance value was correlated to biovolume (biomass concentration) in a calibration experiment, where daily samples were extracted from a growing bioreactor culture at different viable cell concentrations. The viable cell concentration and mean cell diameter were determined for each sample using a Nova Bioprofile Flex (Nova Biomedical, Waltham, Mass.). The viable biovolume was determined from the aforementioned measurements from the Flex by assuming a spherical cell geometry:

$$\phi = vCC * \frac{4}{3}\pi\left(\frac{D}{2}\right)^3 * 1 \times 10^{-12}$$

Where φ is the viable biovolume fraction in mL/mL, vCC is the viable cell concentration in cells/mL, and D is the mean cell diameter in μm.

The calibration experiment resulted in a linear correlation between φ and capacitance.

$$\phi = m*C + b$$

Where φ is the viable biovolume in mL/mL, m is the slope of the calibration curve (mL*cm/(mL*pF)), C is the capacitance (pF/cm), and b is the intercept of the calibration curve (mL/mL).

Special note on biovolume: The biovolume fraction, which is akin to a concentration, in mL/mL, φ, is an analogue of VCC (cell/mL). The viable biovolume, mL, is the total biovolume, and an analogue of total cell count (cells). That is, biovolume fraction and VCC are both concentrations, and viable biovolume and total cell count are totals for the whole volume of the reactor.

Operation of Perfusion Cultures for Feeding Operating Space Experiments

Perfusion cultures were performed with a single CHO cell line expressing a monoclonal antibody. Cultures were inoculated at $0.5 \times 10^6$ cells/mL viable cell concentration into a chemically defined basal medium (basal medium+1.9 vol % SF102 (concentrated nutrient feed)), at pH 6.9. The dissolved oxygen concentration was maintained at >=40% air saturation. The cells were allowed to expand until day 6 with supplemental feeds at which point perfusion was initiated at 1 vessel volume (vv)/day (perfusion medium–basal medium+4.21 vol % SF102). As the cells continued to expand, the perfusion rate was increased daily up to maximum of 2 vv/day. Once the culture achieved the desired cell concentration, (or biovolume fraction, depending on the control strategy of that particular run), a cell bleed, which was controlled by the capacitance measurement, was initiated to maintain the culture at a constant cell concentration or biovolume fraction. The perfusion feed rate was adjusted manually to achieve a desired cell specific perfusion rate, or biovolume specific perfusion rate, again depending on the experiment.

Operation of Perfused N−1 Cultures

Perfused N−1 cultures were inoculated at $0.5 \times 10^6$ cells/mL viable cell concentration into the chemically defined basal medium. The cells were allowed to expand until day 4 when perfusion was initiated. The perfusion feed rate determined by the biovolume fraction, as predicted by the capacitance reading as follows:

$$P = K*\phi$$

Where P is the perfusion feed rate in vv/day, K is the biovolume specific perfusion rate (mL feed/mL biovolume/day), and φ is the biovolume fraction (mL biovolume/mL bioreactor).

Figures 4A, 4B:
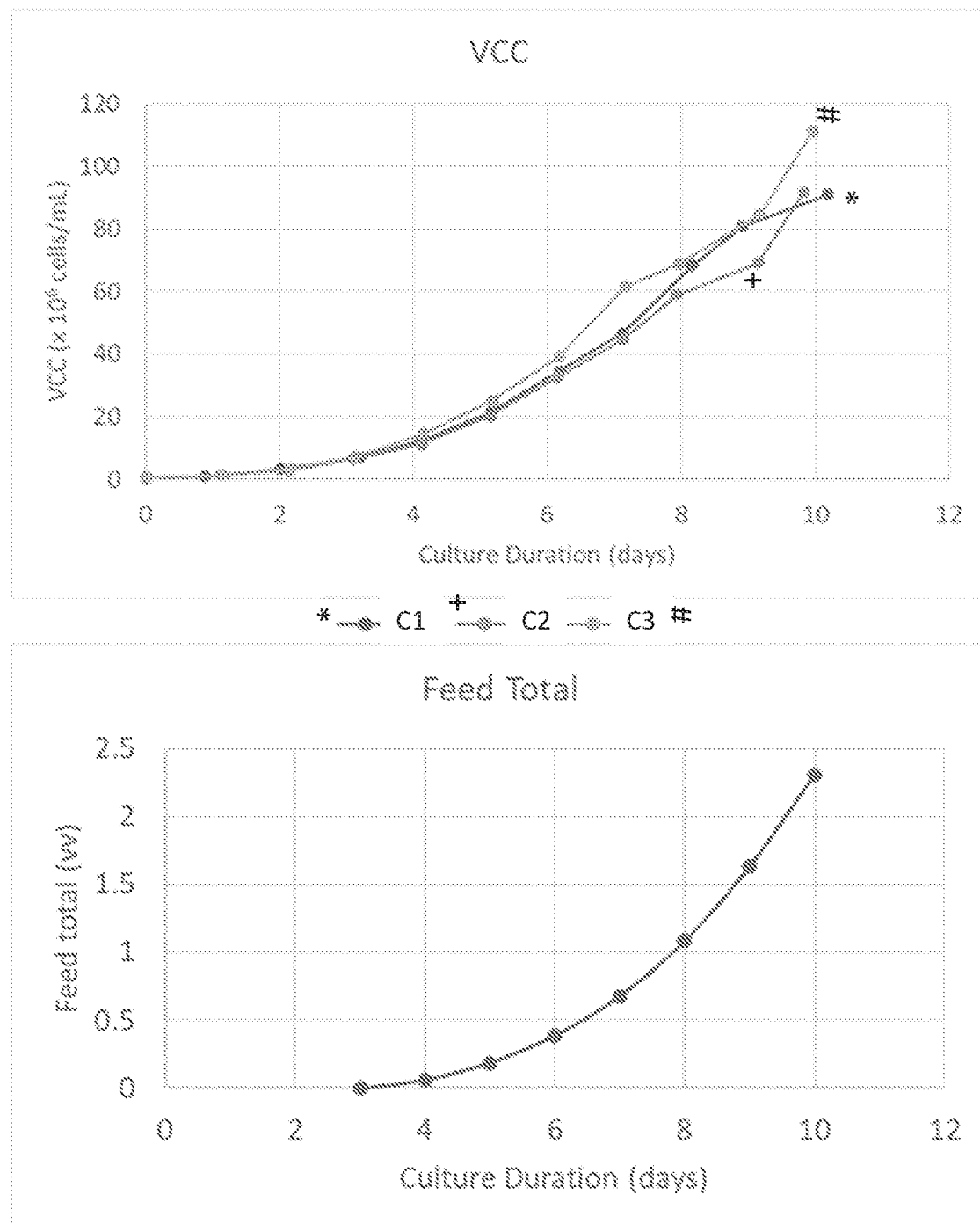
FIGS. 4A-4B show an illustrative example of variable feeding, in accordance with embodiments hereof.

The cells were allowed to divide and the perfusion rate was controlled accordingly up to $100 \times 10^6$ cells/mL. An illustrative example of this variable feeding is shown in FIGS. 4A-4B, for three CHO cell clones (C1-C3).

Creation of Feeding Operating Spaces

For perfusion media feeding, two media feed considerations were explored: the supplementation of sufficient nutrients to satisfy the requirements of the cells without over-feeding, and the removal of waste products from the culture by way of dilution. The perfusion media was separated into two components: a basal media, and a concentrated nutrient supplement. Perfusion media of different degrees of nutrient richness were obtained by varying the amount of nutrient supplement (SF102) added to the basal media. More nutrient supplement resulted in a richer perfusion medium.

Perfusion media were prepared with varying amounts of nutrient supplement added. The cell specific or biovolume specific perfusion rate was then varied for each medium composition, and the steady-state behavior of each culture was observed. Cultures that resulted in a stable steady-state for at least 5 days were considered acceptable performers, and cultures that resulted in viability decrease or apoptosis (and usually culture crash) were considered unacceptable performers.

For each perfusion culture condition, the cell- or biovolume-specific perfusion rate was plotted against the cell- or biovolume-specific concentrated nutrient feed rate. The biovolume- or cell-specific concentrated nutrient feed supplementation rate was determined as the biovolume- or cell-specific perfusion rate times the amount of concentrated nutrient feed added to the basal perfusion media (expressed as a volume fraction) for that particular medium.

Implementation of Feeding Operating Space Learnings in Perfused N−1 Cultures

Figure 5:
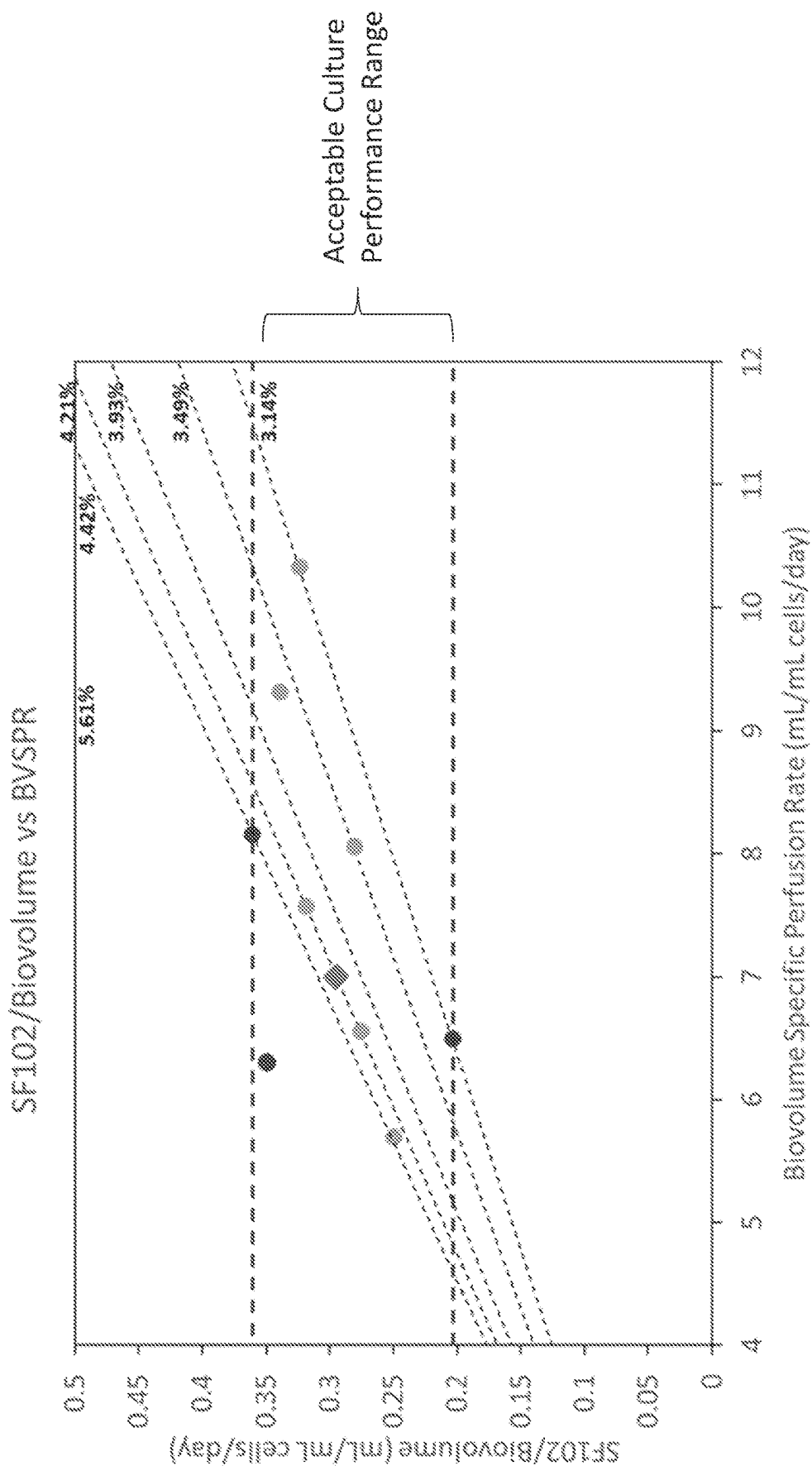
FIG. 5 shows concentrated nutrient feed rate as a function of perfusion medium feed rate normalized per biovolume.

Once an operating space was established which identified ranges of perfusion rates and concentrated nutrient feed supplementation rates that resulted in acceptable (and unacceptable) culture performance (see upper and lower dotted lines in FIG. 5), the operating space was used to identify a perfusion feed condition that would result in acceptable culture performance in a non-steady-state, or N−1 expansion culture. To accomplish this, a condition was chosen near the middle of the pre-defined feeding operating space (see diamond in FIG. 5).

Results

Figure 6:
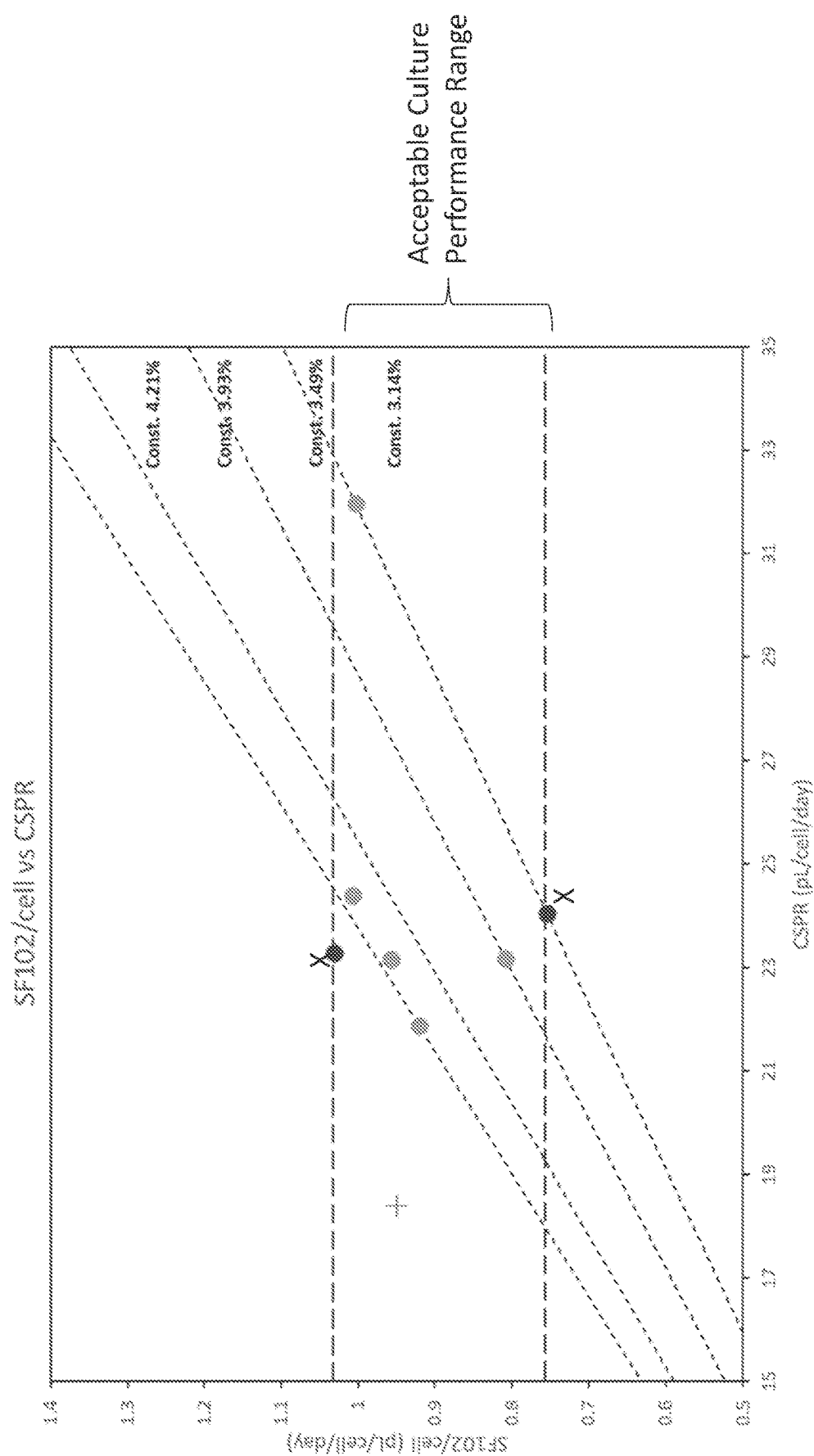
FIG. 6 shows concentrated nutrient feed rate as a function of perfusion medium feed rate normalized per cell.

A set of initial perfusion cultures performed at different nutrient supplementation rates supported the constant nutrient consumption per cell assumption, where unstable cultures (see X labels) were obtained at too high and too low SF102 nutrient feed/cell rates, on the edges of the acceptable culture performance range (FIG. 6).

Based on the initial observations of the proposed high and low nutrient feed rate limits per cell, and the assumption that the limits would be constant, a more intensified culture condition was attempted, which was predicted would use less media (lower CSPR), but still operate within the nutrient feed per cell optimum window (+ sign, FIG. 6). Surprisingly, instead an unstable culture was observed at the new condition (+), along with signs of nutrient over-feeding, including cell size changes.

The assumption of constant nutrient requirements per cell was determined to inaccurate, and that instead, the required nutrients should be predicted fed on a per biovolume basis. This accounts for the fact that bigger cells require more nutrients due to the fact that they have more cellular machinery, and conversely, smaller cells require less nutrients. When the same perfusion conditions are viewed on a per biovolume basis, the selected perfusion condition (+) was actually predicted to be on the overfed side, correlating to what was observed (+ sign—circled, FIG. 7, located at upper dotted line, i.e., upper limit of acceptable culture performance range).

Figure 7:
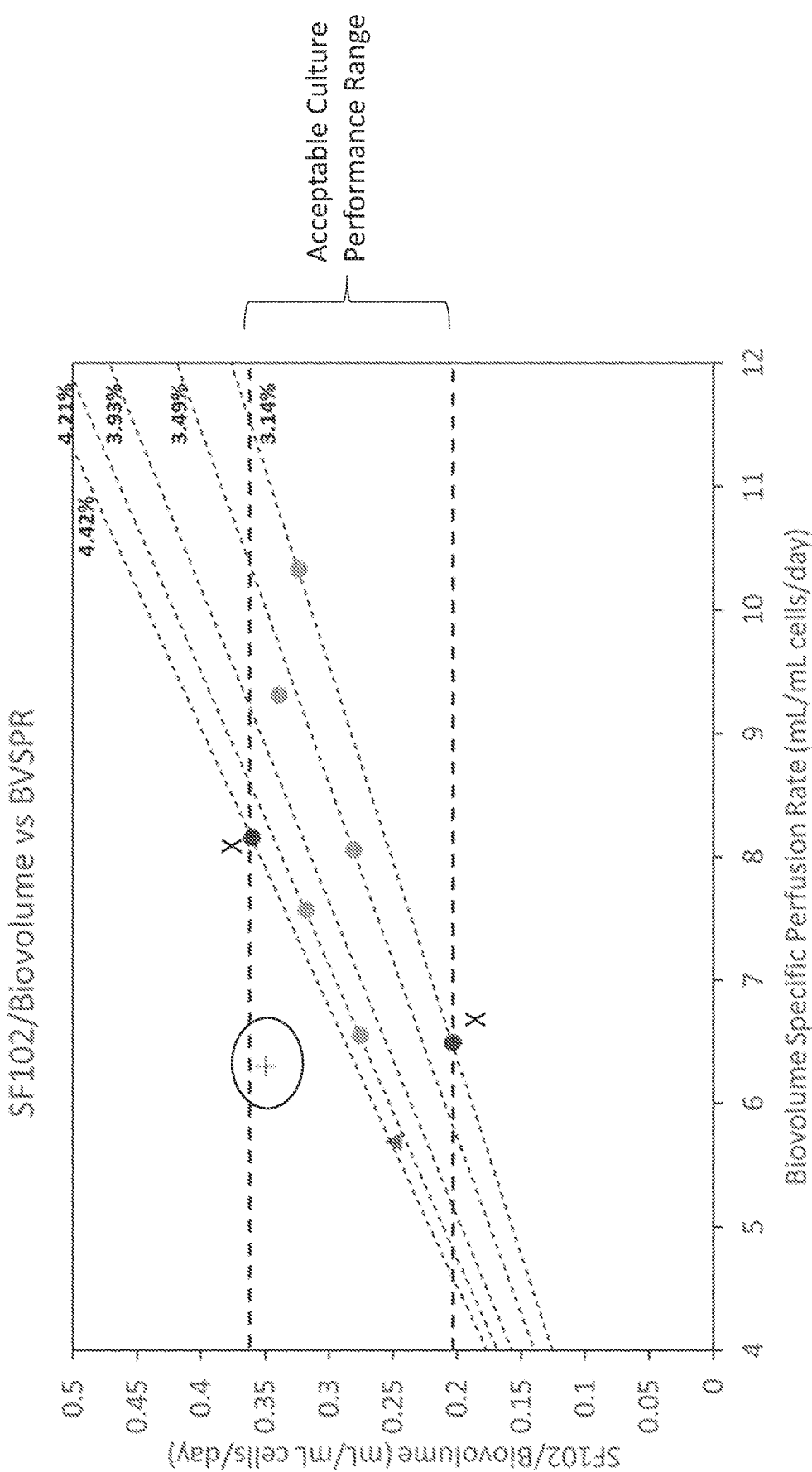
FIG. 7 shows concentrated nutrient feed rate as a function of perfusion medium feed rate normalized per biovolume.

Based on the updated interpretation of feeding limits to a constant per biovolume assumption, a new condition was selected, located in the predicted ideal feeding range of the biovolume specific feeding space (triangle in FIG. 7). This condition yielded a well-performing perfusion culture.

Figure 8:
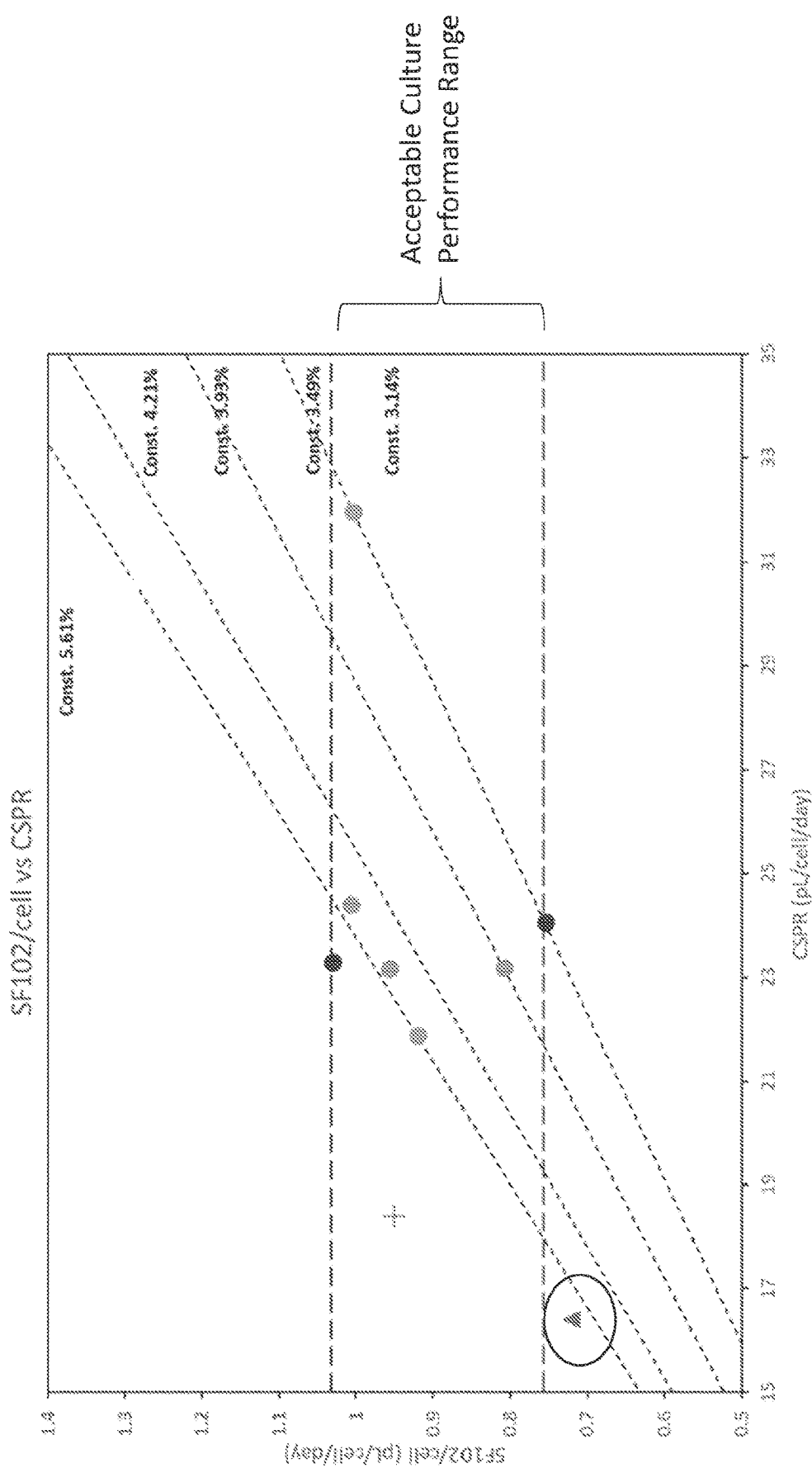
FIG. 8 shows concentrated nutrient feed rate as a function of perfusion medium feed rate normalized per cell.

However, viewed as a function of CSPR, this successful condition would have been predicted to be under-fed using a constant cell specific nutrient feed rate assumption. (FIG. 8, triangle—circled, below lower dotted line and thus outside of "acceptable culture performance range").

Figure 9:
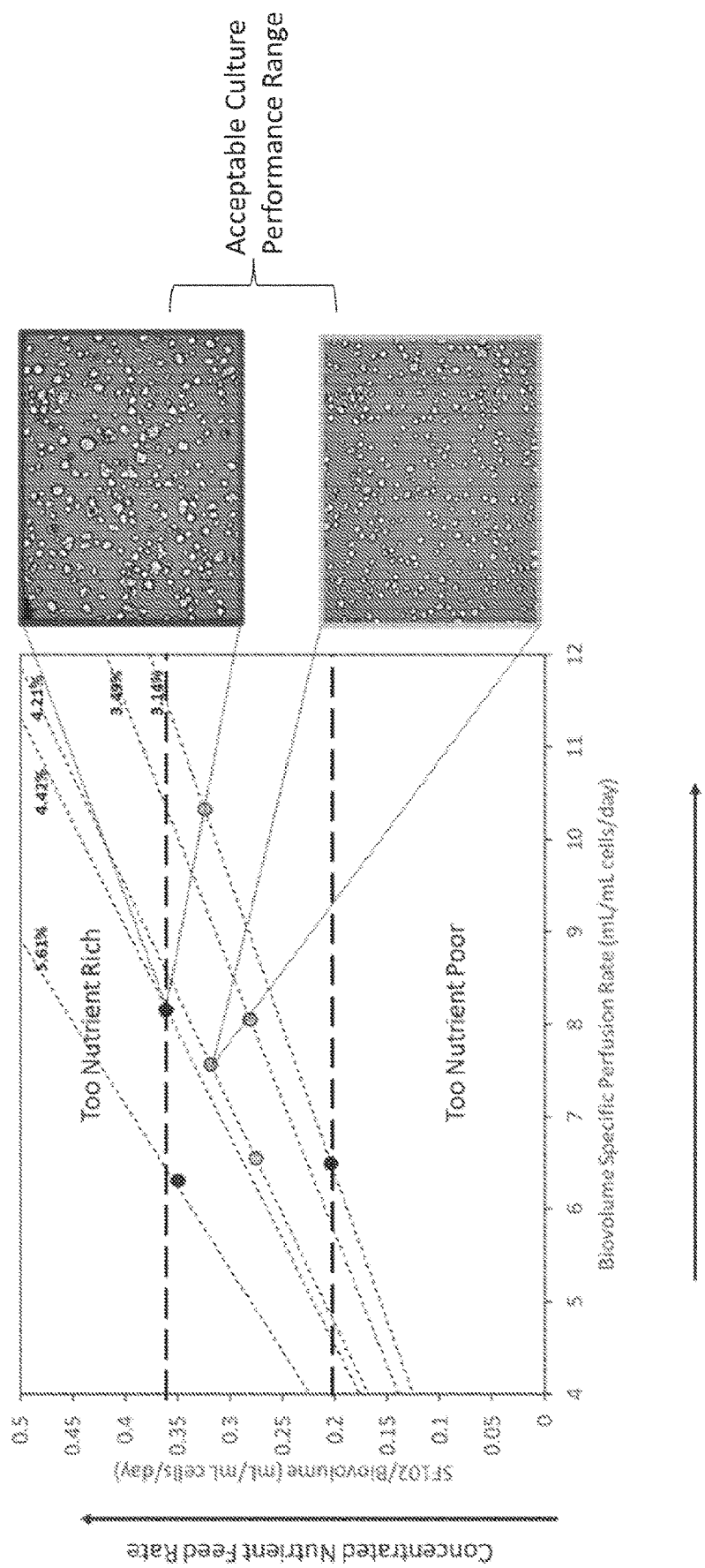
FIG. 9 shows a constant per biovolume based feed strategy, in accordance with embodiments herein.

Based on this unexpected finding a constant per biovolume based feeding strategy was implemented (see FIG. 9). As indicated, if the cells are grown in a "too nutrient rich environment," they do not demonstrate acceptable growth characteristics (top image). However, cells grown with the "acceptable culture performance range" show the desired cellular characteristics of proper cell shape and density.

Implementation of Feed Operating Space into Perfused N−1 Process Optimization

Figure 10:
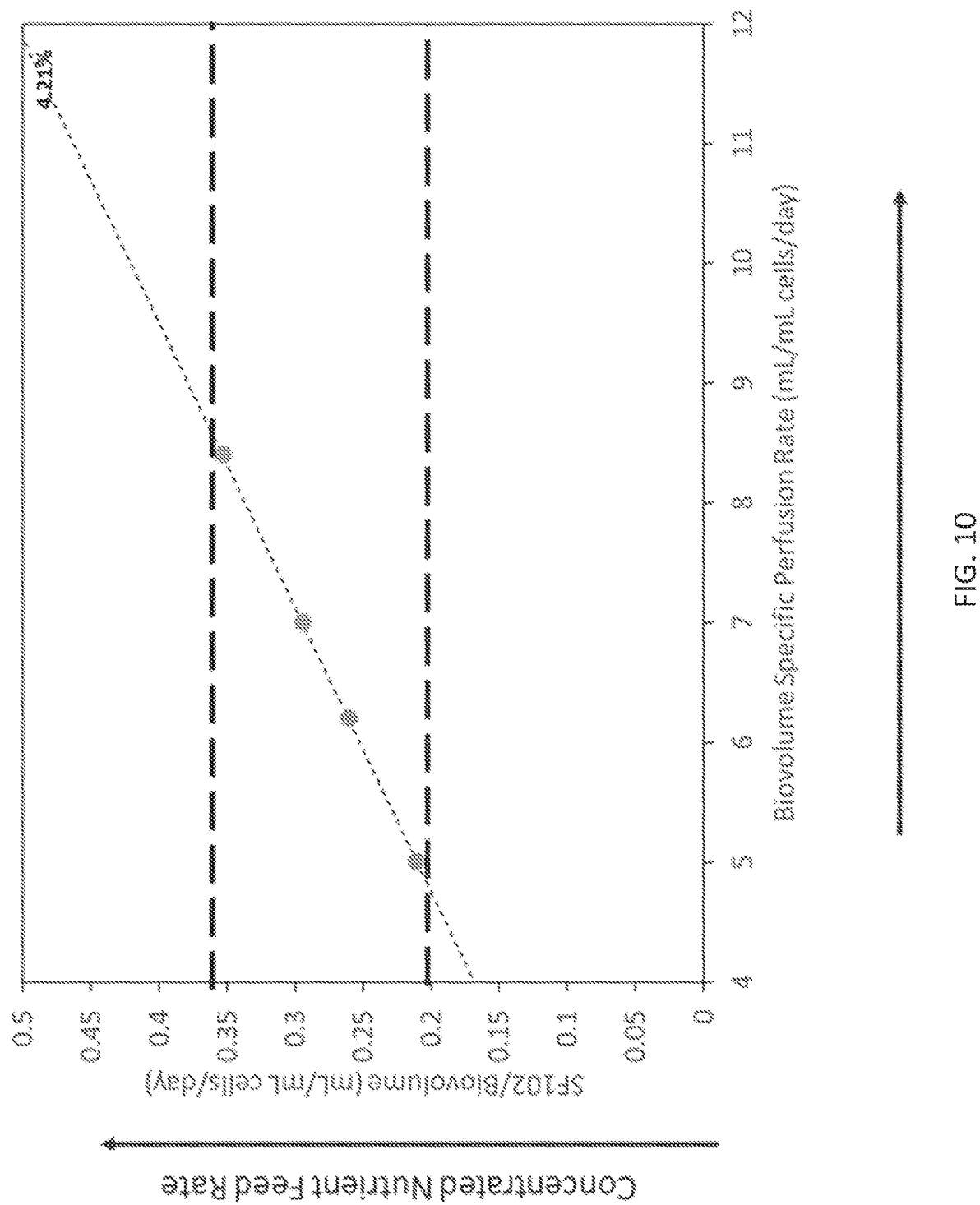
FIG. 10 shows the selection of conditions to examine biovolume specific perfusion rates on cell culture performance.

A range of biovolume specific perfusion feed rates were evaluated for their effect on culture performance. Perfused N−1 cultures were completed at four biovolume specific perfusion rates: 5, 6.2, 7, and 8.4 mL/mL/day. These conditions were selected so that for a single perfusion medium composition, the middle conditions were predicted to provide good culture performance, and the flanking conditions were predicted to be near the edge of the acceptable operating space, but still in bounds (see FIG. 10).

Figure 11B:
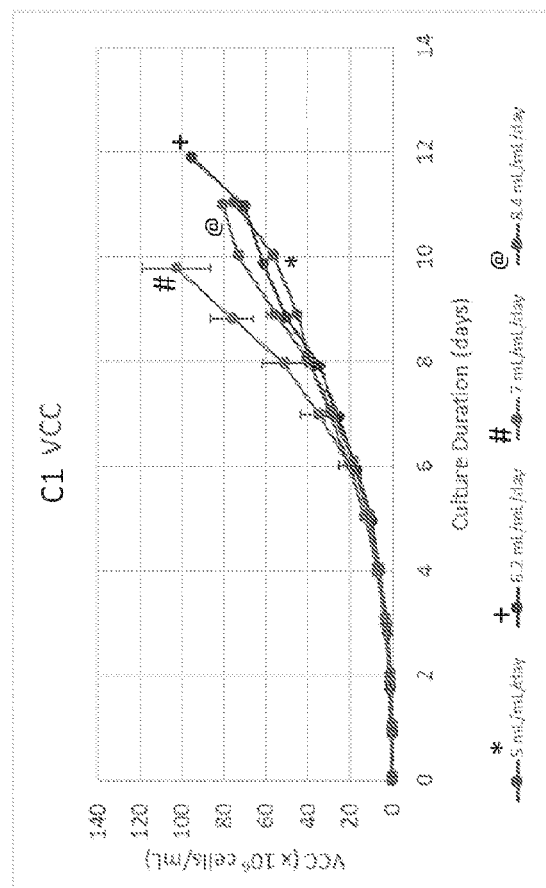
FIGS. 11A-11B show media consumption and cell density for four BVSPR conditions.
Figure 11A:
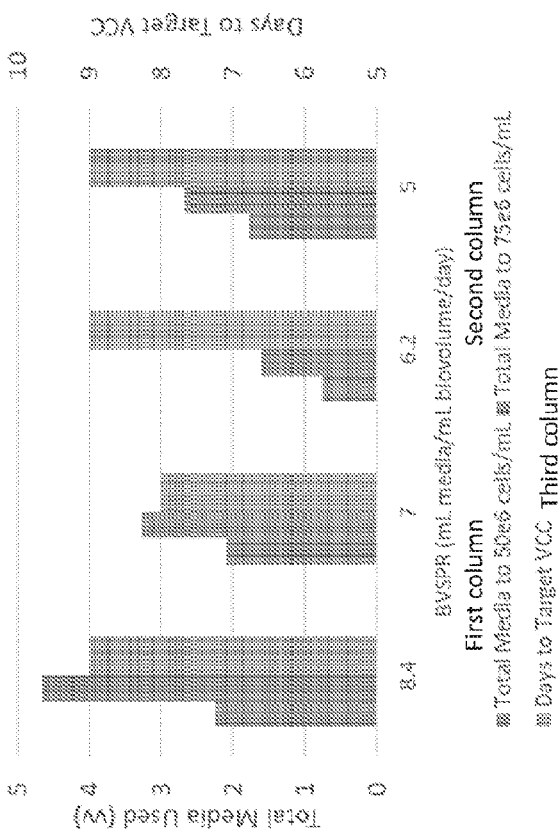

Each culture successfully reached a cell density of at least 75×10^6 cells/mL, as predicted by the operating space. However, conditions nearer to the edge of the space resulted in slower growth, and correspondingly a higher amount of media consumption (8.4 and 5 BVSPR), than those in the center of the space (and 6.2 BVSPR) (see FIG. 11A). FIG. 11B shows the cell density (VCC) for each of the selected conditions for CHO cell clone L1.

Figure 12:
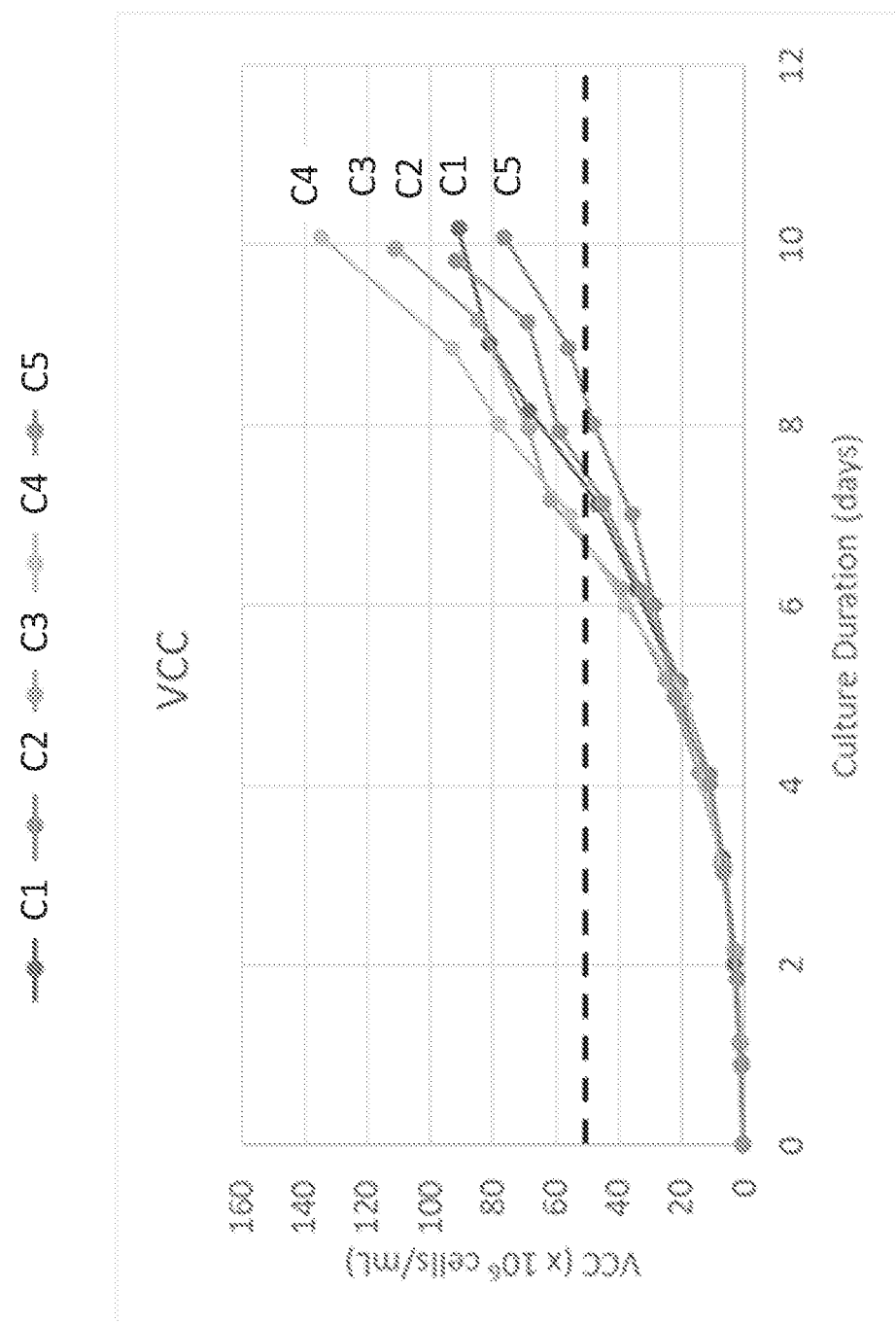
FIG. 12 shows cell density for five cell clones, cultured with a BVSPR condition of 7 mL/mL/day.

Finally, the optimal condition identified in FIG. 11B for the single cell clone (7 mL/mL/day) (C1), was applied to four other clones (C2-L5), all of which showed favorable growth characteristics. This supports that the biovolume specific feeding approach is a platform approach, and not restricted to just 1 cell line (FIG. 12).

In summary, it was surprisingly found that the use of a model based on biovolume—the percentage of the reactor volume (i.e., liquid volume: liquid media, cells, cell debris, etc.) that is inside the cell membranes of the cells—more accurately predicted the feeding conditions required to provide a desirable perfusion culture.

Scaling-Up of Process

Figure 13:
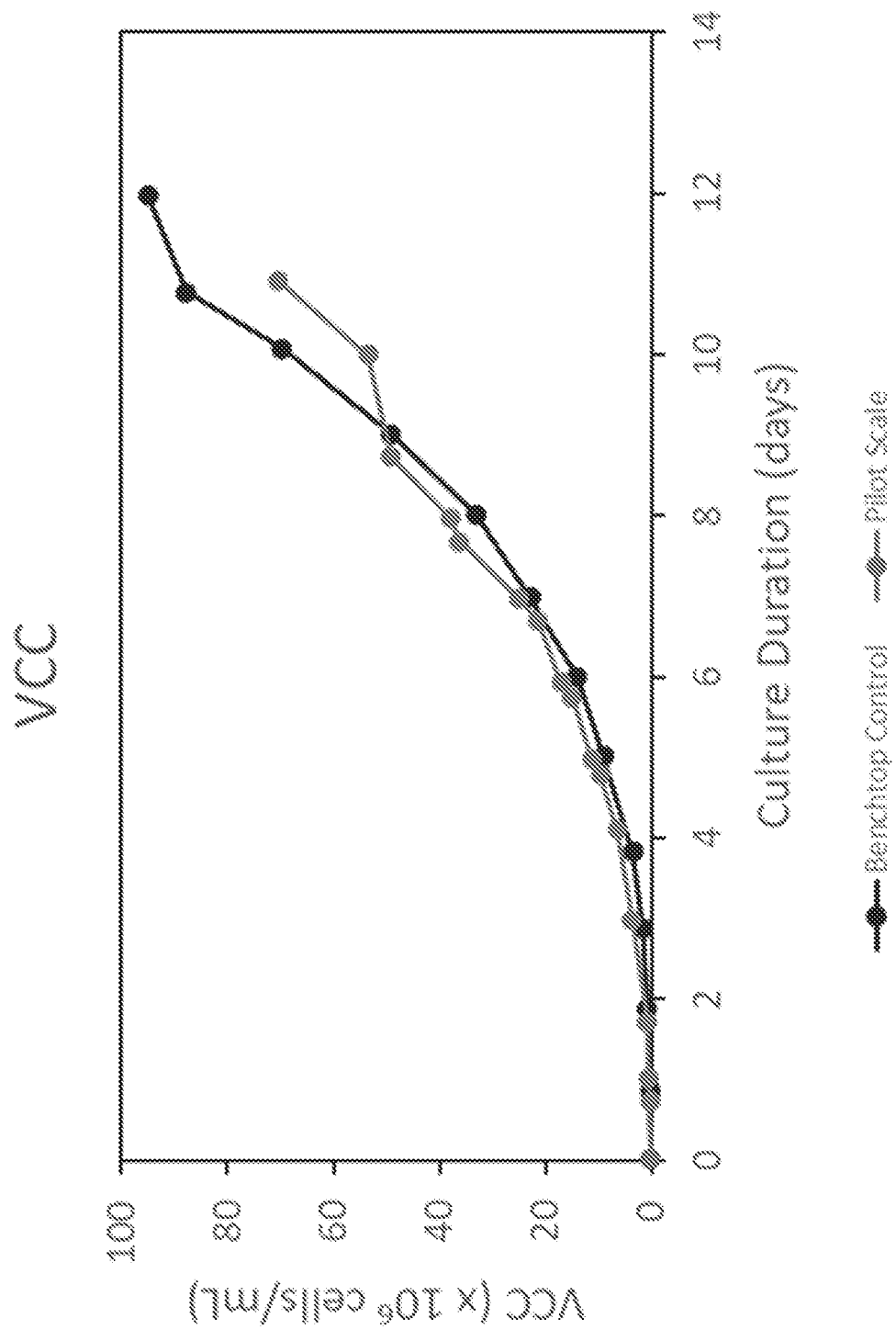
FIG. 13 shows the scaling up of the N-1 process from bench scale to 50 L bioreactor.

FIG. 13 shows the successful scaling up the N−1 process to a 50 L single use stirred tank reactor (pilot scale) from benchtop scale. The defined target VCC of 50×10^6 cells/mL, was achieved at approximately the same culture duration (about 9 days). This target requirement was in fact exceeded, and reached a VCC of 70 million cells/mL on day 11. These results demonstrate that the process including automation was able to translate to different scale and different reactor format.

Exemplary Embodiments

Embodiment 1 is a process for producing an inoculum for a subsequent cell culture production process comprising: introducing a cell culture into a perfusion bioreactor; feeding a nutrient media at a flow rate to the perfusion bioreactor and withdrawing fluid media from the perfusion bioreactor; determining biomass concentrations over time within the perfusion bioreactor using a biomass sensor, such as a capacitance sensor, the biomass sensor being in communication with a controller; and adjusting the nutrient media flow rate into the perfusion bioreactor based on biomass concentrations sensed by the biomass sensor, the controller being configured to adjust the media flow rate based on information received from the biomass sensor, wherein the nutrient media flow rate is adjusted based on the following relationship: $P=K*\varphi$ wherein K is the biovolume specific perfusion rate (mL feed/mL biovolume/day);

$\varphi$ is the biovolume fraction and is the volume of the perfusion bioreactor that is inside the cell membranes of the cells, expressed as a percentage or fraction (mL biovolume/mL bioreactor); and P is the perfusion rate expressed in mL feed/mL bioreactor/day.

Embodiment 2 includes the process as defined in embodiment 1, wherein the controller is configured to increase the flow rate of the nutrient media as the biomass concentration increases Embodiment 3 includes the process as defined in any of the preceding embodiments, further comprising the step of determining the amount of fluid media within the perfusion bioreactor and based on the amount, selectively increasing or decreasing a rate at which the fluid media is withdrawn from the perfusion bioreactor.

Embodiment 4 includes the process as defined in embodiment 3, wherein the amount of fluid media within the perfusion bioreactor is determined by weighing the perfusion bioreactor using a weighing device.

Embodiment 5 includes the process as defined in embodiment 4, wherein the weighing device is in communication with the controller, and based on weight information from the weighing device, the controller is configured to control a pumping device in fluid communication with the perfusion bioreactor for selectively increasing or decreasing the rate at with fluid media is withdrawn.

Embodiment 6 includes the process as defined in embodiment 5, wherein the fluid media withdrawn from the perfusion bioreactor is filtered for preventing biomass from being withdrawn from the bioreactor with the fluid media.

Embodiment 7 includes the process as defined in embodiment 3, wherein the amount of fluid media within the perfusion bioreactor is determined by measuring volume.

Embodiment 8 includes the process as defined in any of the preceding embodiments, wherein the cell culture has a cell density and the cell density increases over time in the perfusion bioreactor.

Embodiment 9 includes the process as defined in embodiment 8, wherein a volume containing the fluid media and the cell culture remains constant during the process.

Embodiment 10 includes the process as defined in any of the preceding claims, wherein the cell culture comprises mammalian cells.

Embodiment 11 includes process as defined in any of the preceding embodiments, wherein the biomass sensor determines the biomass concentration within the perfusion reactor at least every 6 hours.

Embodiment 12 includes the process as defined in any of the preceding embodiments, wherein the perfusion bioreactor has a volume of from about 10 liters to about 4000 L.

Embodiment 13 includes the process as defined in any of the preceding embodiments, wherein after an incubation period, the process further includes transferring the cell culture from the perfusion bioreactor to a second bioreactor, the second bioreactor having a volume that is larger than a volume of the perfusion bioreactor, the volume ratio between the perfusion bioreactor and the second bioreactor being from 1:3 to 1:40, such as from about 1:4 to about 1:10.

Embodiment 14 includes the process as defined in embodiment 13, wherein the cell culture continues to grow in the second bioreactor in a fed batch-type manner.

Embodiment 15 includes the process as defined in embodiment 13 or 14, wherein the cell culture remains in the perfusion bioreactor from about 3 days to about 12 days and remains in the second bioreactor for less than about 12 days, such as less than about 10 days.

Embodiment 16 incudes the process as defined in any of the preceding embodiments, wherein the cell culture reaches a cell density within the perfusion bioreactor of greater than about $10 \times 10^6$ cells/mL, such as greater than about $30 \times 10^6$ cells/mL, such as greater than about $50 \times 10^6$ cells/mL, such as greater than about $70 \times 10^6$ cells/mL.

Embodiment 17 includes the process as defined in any of the preceding embodiments, wherein the cell culture reaches a cell density within the perfusion bioreactor of $100 \times 10^6$ cells/mL or greater.

Embodiment 18 includes the process as defined in any of the preceding embodiments, wherein the cell culture has a cell density and wherein the cell density increases by at least 60% per day within the perfusion bioreactor.

Embodiment 19 is a system for producing an inoculum for a subsequent cell culture production process comprising: a perfusion bioreactor; a nutrient media feed in fluid communication with the perfusion bioreactor, the nutrient media feed for feeding a nutrient media to the perfusion bioreactor for growing a cell culture; an effluent for withdrawing fluid media from the perfusion bioreactor; a pumping device in fluid communication with the effluent of the perfusion bioreactor for withdrawing controlled amounts of fluid media from the perfusion bioreactor; a weighing device for monitoring a weight of the perfusion bioreactor; a biomass sensor, such as a capacitance sensor, in fluid communication with the perfusion bioreactor for determining biomass concentrations within the perfusion bioreactor; and a controller in communication with the biomass sensor and the weighing device, the controller being configured to control the nutrient media feed for increasing or decreasing a flow rate of nutrient media being fed to the perfusion bioreactor based on information received from the biomass sensor, the controller also being configured to control the pumping device for increasing or decreasing a flow rate of fluid media being withdrawn from the perfusion bioreactor based on information received from the weighing device, wherein the controller controls the flow weight of the nutrient media in to the perfusion bioreactor based upon the following relationship: $P=K*\varphi$ wherein K is the biovolume specific perfusion rate (mL feed/mL biovolume/day);

$\varphi$ is the biovolume fraction and is the volume of the perfusion bioreactor that is inside the cell membranes of the cells, expressed as a percentage or fraction (mL biovolume/mL bioreactor); and P is the perfusion rate expressed in mL feed/mL bioreactor/day.

Embodiment 20 system as defined in embodiment 19, wherein the controller comprises one or more microprocessors.

Embodiment 21 is a system as defined in any of embodiments 19 through 20, wherein the perfusion bioreactor has a volume of from about 10 liters to about 250 liters.

Embodiment 22 is a system as defined in any of embodiments 19 through 21 further comprising a second bioreactor in fluid communication with the perfusion bioreactor, the second bioreactor being configured to receive a cell culture from the perfusion bioreactor, the second bioreactor having a volume that is larger than a volume of the perfusion bioreactor, the volume ratio between the perfusion bioreactor and the second bioreactor being from 1:3 to 1:40, such as from about 1:4 to about 1:10.

Embodiment 23 is a cell culture production process comprising: introducing a cell culture into a perfusion bioreactor; feeding a nutrient media at a flow rate to the perfusion bioreactor and withdrawing fluid media from the perfusion bioreactor; determining biomass concentrations over time within the perfusion bioreactor using a biomass sensor, the biomass sensor being in communication with a controller; and adjusting the nutrient media flow rate into the perfusion bioreactor based on biomass concentrations sensed by the biomass sensor, the controller being configured to adjust the media flow rate based on information received from the biomass sensor, wherein the nutrient media flow rate is adjusted based on the following relationship: $P=K*\varphi$ wherein K is the biovolume specific perfusion rate (mL feed/mL biovolume/day);

$\varphi$ is the biovolume fraction and is the volume of the perfusion bioreactor that is inside the cell membranes of the cells, expressed as a percentage or fraction (mL biovolume/mL bioreactor); and P is the perfusion rate expressed in mL feed/mL bioreactor/day.

Embodiment 24 includes the process as defined in embodiment 23, wherein after an incubation period, the cell culture is fed to a purification process.

Embodiment 25 includes the process as defined in embodiment 23, wherein, after an incubation period, a bioproduct is harvested from the cell culture.

Embodiment 26 includes a cell culture production process comprising: producing an inoculum by the method of any of embodiments 1-18 comprising host cells that express a bioproduct;

introducing the inoculum into a production bioreactor;
culturing the host cells to produce the bioproduct;
harvesting the bioproduct from the cell culture; and
optionally subjecting the bioproduct to one or more purification steps.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

The invention claimed is:

1. A process for producing an inoculum for a subsequent cell culture production process comprising:
   a. introducing a cell culture into a perfusion bioreactor;
   b. feeding a nutrient media at a flow rate to the perfusion bioreactor and withdrawing fluid media from the perfusion bioreactor;
   c. determining biomass concentrations over time within the perfusion bioreactor using a biomass sensor, the biomass sensor being in communication with a controller; and
   d. adjusting the nutrient media flow rate into the perfusion bioreactor based on biomass concentrations sensed by the biomass sensor, the controller being configured to adjust the media flow rate based on information received from the biomass sensor, wherein the nutrient media flow rate is adjusted based on the following relationship:

$$P = K\varphi$$

wherein K is the biovolume specific perfusion rate (mL feed/mL biovolume/day);
  φ is the biovolume fraction and is the volume of the perfusion bioreactor that is inside the cell membranes of the cells, expressed as a percentage or fraction (mL biovolume/mL bioreactor); and P is the perfusion rate expressed in mL feed/mL bioreactor/day,
  thereby producing the inoculum.

2. The process according to claim 1, wherein the biomass sensor is a capacitance sensor.

3. The process according to claim 1, wherein the controller is configured to increase the flow rate of the nutrient media as the biomass concentration increases.

4. The process according to claim 1, further comprising determining the amount of fluid media within the perfusion bioreactor and based on the amount, selectively increasing or decreasing a rate at which the fluid media is withdrawn from the perfusion bioreactor.

5. The process according to claim 4, wherein the amount of fluid media within the perfusion bioreactor is determined by weighing the perfusion bioreactor using a weighing device.

6. The process according to claim 5, wherein the weighing device is in communication with the controller, and based on weight information from the weighing device, the controller is configured to control a pumping device in fluid communication with the perfusion bioreactor for selectively increasing or decreasing the rate at with fluid media is withdrawn.

7. The process according to claim 4, wherein the amount of fluid media within the perfusion bioreactor is determined by measuring volume.

8. The process according to claim 1, wherein the cell density in the cell culture in the perfusion bioreactor increases over time by at least 60% per day.

9. The process according to claim 1, wherein the biomass sensor determines the biomass concentration within the perfusion reactor at least every 6 hours.

10. The process according to claim 1, wherein the perfusion bioreactor has a volume of from about 10 L to about 4000 L.

11. The process according to claim 1, wherein after an incubation period, the process further includes transferring the cell culture from the perfusion bioreactor to a second bioreactor, the second bioreactor having a volume that is larger than a volume of the perfusion bioreactor, and the volume ratio between the perfusion bioreactor and the second bioreactor is about 1:3 to 1:40.

12. The process according to claim 11, wherein the cell culture continues to grow in the second bioreactor in a fed batch-type manner.

13. The process according to claim 11, wherein the cell culture remains in the perfusion bioreactor from about 3 days to about 12 days and remains in the second bioreactor for less than about 12 days.

14. The process according to claim 13, wherein the cell culture remains in the second bioreactor for less than about 10 days.

15. The process according to claim 11, wherein the volume ratio between the perfusion bioreactor and the second bioreactor is about 1:4 to about 1:10.

16. The process according to claim 1, wherein the cell culture reaches a cell density within the perfusion bioreactor of greater than about $10 \times 10^6$ cells/mL.

17. The process according to claim 1, wherein the cell culture reaches a cell density within the perfusion bioreactor of $100 \times 10^6$ cells/mL or greater.

18. The process according to claim 1, wherein the cell culture comprises mammalian cells.

19. A cell culture production process comprising:
  a. producing an inoculum by the method of claim 1 comprising host cells that express a bioproduct;
  b. introducing the inoculum into a production bioreactor;
  C. culturing the host cells to produce the bioproduct;
  d. harvesting the bioproduct from the cell culture; and
  e. optionally subjecting the bioproduct to one or more purification steps.

* * * * *